United States Patent
Wang et al.

(10) Patent No.: US 11,866,804 B2
(45) Date of Patent: *Jan. 9, 2024

(54) PREPARATION OF RARE EARTH METALS AND OTHER CHEMICALS FROM INDUSTRIAL WASTE COAL ASH

(71) Applicant: Purdue Research Foundation, West Lafayette, IN (US)

(72) Inventors: Nien-Hwa Linda Wang, West Lafayette, IN (US); Hoon Choi, Miami, FL (US); David Harvey, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,403

(22) Filed: Nov. 29, 2021

(65) Prior Publication Data
US 2022/0195559 A1 Jun. 23, 2022

Related U.S. Application Data

(63) Continuation of application No. 16/193,566, filed on Nov. 16, 2018, now Pat. No. 11,186,894.
(Continued)

(51) Int. Cl.
*C22B 7/00* (2006.01)
*C22B 7/02* (2006.01)
(Continued)

(52) U.S. Cl.
CPC .............. *C22B 7/007* (2013.01); *C01B 33/14* (2013.01); *C01B 33/26* (2013.01); *C01B 33/32* (2013.01);
(Continued)

(58) Field of Classification Search
CPC ......... C01B 33/14; C01B 33/26; C01B 33/32; C01D 13/00; C01F 7/0693; C01F 11/02;
(Continued)

(56) References Cited

U.S. PATENT DOCUMENTS 9,260,767 B2 2/2016 Boudreault et al.
9,394,586 B2 7/2016 Joshi et al.
(Continued)

FOREIGN PATENT DOCUMENTS

WO 2016011396 1/2016

*Primary Examiner* — Sally A Merkling
*Assistant Examiner* — Dean Mazzola
(74) *Attorney, Agent, or Firm* — C. John Brannon; Brannon Sowers & Cracraft PC

(57) ABSTRACT

A process for the isolation and purification of substantially pure chemicals, including silica gel, sodium silicate, aluminum silicate, iron oxide, and rare earth elements (or rare earth metals, REEs), from massive industrial waste coal ash including a plurality of caustic extractions of coal ash at an elevated temperature, followed by an acidic treatment to dissolve aluminum silicate and REEs. Dissolved aluminum silicate is precipitated out by pH adjustment as a solid product while REEs remain in the solution. REEs are captured and enriched using an ion exchange column. Alternatively, the solution containing aluminum silicate and REEs is heated to produce silica gel, which is separated from the enriched REEs solution. REEs are then isolated and purified from the enriched solution to afford substantially pure individual REE by a ligand-assisted chromatography.

21 Claims, 26 Drawing Sheets

Related U.S. Application Data

(60) Provisional application No. 62/588,685, filed on Nov. 20, 2017.

(51) Int. Cl.

| | | |
|---|---|---|
| *C22B 3/42* | (2006.01) | |
| *C22B 3/44* | (2006.01) | |
| *C01B 33/14* | (2006.01) | |
| *C22B 59/00* | (2006.01) | |
| *C22B 21/00* | (2006.01) | |
| *C22B 3/10* | (2006.01) | |
| *C01G 49/06* | (2006.01) | |
| *C01F 7/0693* | (2022.01) | |
| *C01F 11/02* | (2006.01) | |
| *C01G 49/02* | (2006.01) | |
| *C01F 11/24* | (2006.01) | |
| *C01B 33/26* | (2006.01) | |
| *C01B 33/32* | (2006.01) | |
| *C01G 49/10* | (2006.01) | |
| *C01F 17/271* | (2020.01) | |
| *C22B 3/06* | (2006.01) | |
| *C22B 3/08* | (2006.01) | |
| *C01D 13/00* | (2006.01) | |

(52) U.S. Cl.
CPC ............ *C01F 7/0693* (2013.01); *C01F 11/02* (2013.01); *C01F 11/24* (2013.01); *C01F 17/271* (2020.01); *C01G 49/02* (2013.01); *C01G 49/06* (2013.01); *C01G 49/10* (2013.01); *C22B 3/065* (2013.01); *C22B 3/08* (2013.01); *C22B 3/10* (2013.01); *C22B 3/42* (2013.01); *C22B 3/44* (2013.01); *C22B 7/02* (2013.01); *C22B 21/0023* (2013.01); *C22B 59/00* (2013.01); *C01D 13/00* (2013.01)

(58) Field of Classification Search
CPC ........ C01F 11/24; C01F 17/271; C01G 49/02; C01G 49/06; C01G 49/10; C22B 3/065; C22B 3/08; C22B 3/10; C22B 3/42; C22B 3/44; C22B 7/007; C22B 7/02; C22B 21/0023; C22B 59/00
See application file for complete search history.

(56) References Cited

U.S. PATENT DOCUMENTS

| | | |
|---|---|---|
| 9,534,274 B2 | 1/2017 | Boudreault et al. |
| 9,556,500 B2 | 1/2017 | Boudreault et al. |
| 9,945,009 B2 | 4/2018 | Boudreault et al. |
| 10,174,402 B2 | 1/2019 | Boudreault et al. |
| 2015/0075328 A1 | 3/2015 | Boudreault et al. |
| 2015/0143954 A1 | 5/2015 | Neumann et al. |
| 2017/0356067 A1 | 12/2017 | Peterson et al. |
| 2019/0210883 A1 | 7/2019 | Park et al. |
| 2019/0309392 A1 | 10/2019 | Imerito |

```
┌─────────────────────────────────────────────────┐
│ Caustic dissolution to recover sodium silicate  │
│                 from coal ash                   │
└─────────────────────────────────────────────────┘
                        ▼
┌─────────────────────────────────────────────────┐
│ Acid dissolution to recover aluminum silicate   │
│                   and REEs                      │
└─────────────────────────────────────────────────┘
                        ▼
┌─────────────────────────────────────────────────┐
│  Separate aluminum silicate and recover REE     │
│            from acidic solution                 │
└─────────────────────────────────────────────────┘
                   │
          ┌────────┴────────┐
          ▼                 ▼
┌──────────────────┐  ┌──────────────────┐
│ 1) Produce       │  │ 2) Produce silica│
│ aluminum silicate│  │ gel and aluminum │
│ by adding NaOH   │  │ hydroxide        │
└──────────────────┘  └──────────────────┘

┌─────────────────────────────────────────────────┐
│ Purify REEs using ligand-assisted chromatography│
└─────────────────────────────────────────────────┘
```

FIG. 3

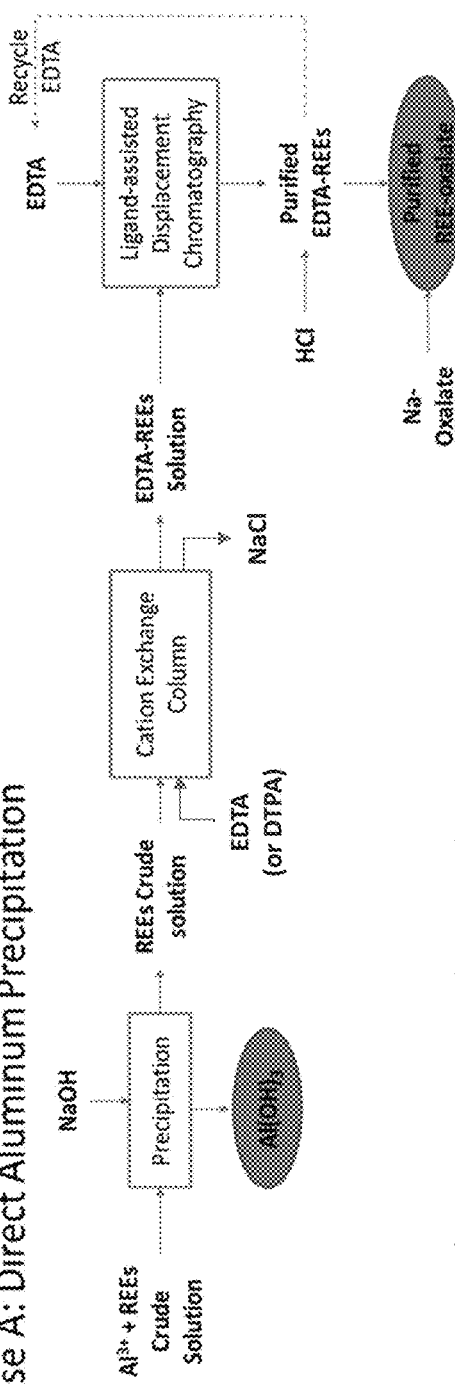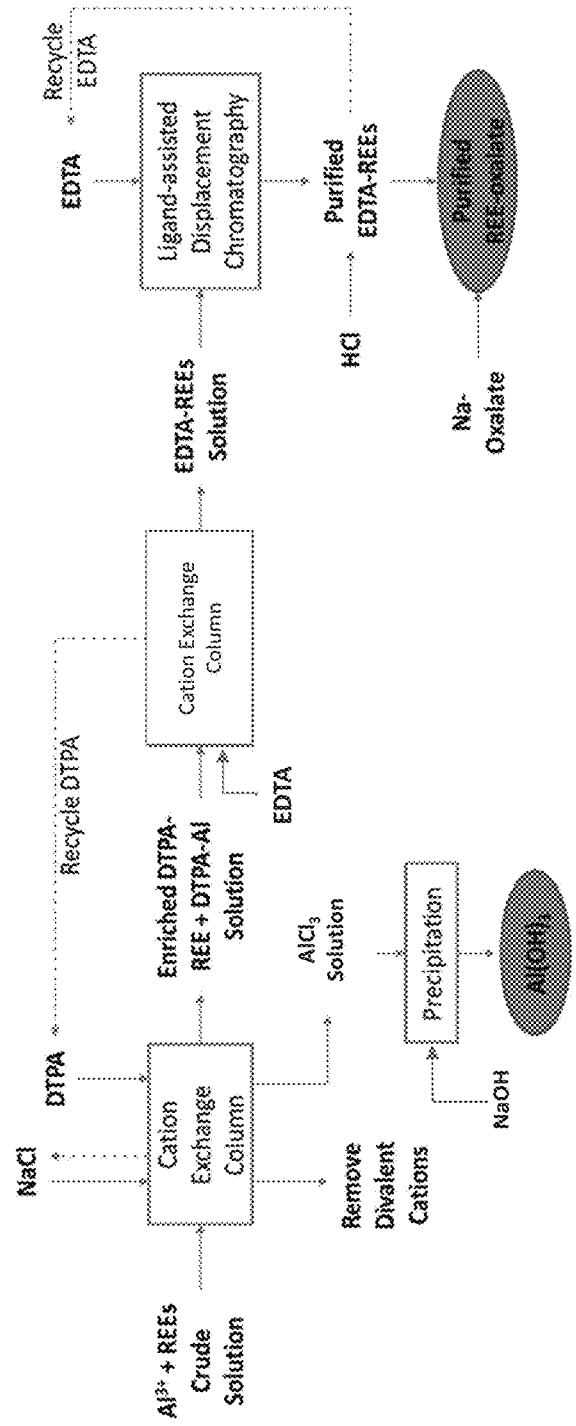
Fig. 5B (a)

PREPARATION OF RARE EARTH METALS AND OTHER CHEMICALS FROM INDUSTRIAL WASTE COAL ASH

CROSS-REFERENCE TO RELATED APPLICATIONS

The present U.S. patent application is a continuation of patent application Ser. No. 16/193,566, filed Nov. 16, 2018, which relates to and claims the priority benefit of U.S. Provisional Patent Application Ser. No. 62/588,685, filed Nov. 20, 2017, the content of which is hereby incorporated by reference in its entirety.

GOVERNMENT SUPPORT CLAUSE

This invention was made with government support under CBET1403854 awarded by the National Science Foundation. The government has certain rights in the invention.

TECHNICAL FIELD

The present application relates to a process for preparation of substantially pure chemicals, including sodium silicate, aluminum silicate, silica gel, iron oxide, aluminum oxide, and rare earth elements (REEs), from industrial waste coal ash.

BACKGROUND

This section introduces aspects that may help facilitate a better understanding of the disclosure. Accordingly, these statements are to be read in this light and are not to be understood as admissions about what is or is not prior art.

Coal ash is the waste that is left after coal is combusted (burned). It includes fly ash, the fine powdery particles that are carried up the smoke stack and captured by pollution control devices, as well as coarser materials that fall to the bottom of the furnace. Coal fly ash are fine particles captured in exhaust gas by electrostatic precipitators and bag houses of coal-fired power plants. Fly ash is very fine with cement like properties and has long been used as an additive in cement, though not without some controversy. Bottom ash is the larger, coarser variety of ash collected at the bottom of the boilers. The ratio of fly ash to bottom ash ranges from 70:30 to 80:20 depending on the type of boiler and type of coal.

Fly ash is typically stored dry in silos, from which it can be used or disposed of in a dry or wet form. Water can be added to the fly ash to allow for stockpiling or landfilling in a conditioned form (approximately 15 to 30 percent moisture), or for disposal by sluicing into settling ponds or lagoons in a wet form.

Coal ash is the largest type of waste generated in the United States and in many other countries, with over 100 million tons produced in the USA every year. Coal ash contains a toxic stew of chemicals including lead, arsenic, mercury and radioactive uranium. The size of this problem begs the question, is there any beneficial use for those massive coal ash waste? The EPA supports the 'beneficial use' of waste products and defines it as the reuse in a product that provides a functional benefit, replaces a product made from virgin raw materials, conserves natural resources and meets product specifications and industry standards. Beneficial use of waste products can contribute to a sustainable future by reducing production costs, reducing energy consumption and greenhouse gasses. There are urgent needs to put the massive amount of industrial waste coal ash to a meaningful use and reduce the environmental impacts of those coal-fired power plants. The present disclosure provides a potential solution to those unmet needs.

SUMMARY

A process disclosed herein is related to the isolation and purification of substantially pure chemicals, including silica gel, sodium silicate, aluminum silicate, iron oxide, and rare earth elements (or ram earth metals, REEs), from massive industrial waste coal ash. In some embodiments, the process includes a plurality of caustic extractions of coal ash at an elevated temperature, followed by an acidic treatment to dissolve aluminum silicate and REEs. The dissolved aluminum silicate is precipitated out by pH adjustment as a solid product while REEs remain in the solution. REEs are captured and enriched using an ion exchange column. Alternatively, the solution containing aluminum silicate and REEs is heated to produce silica gel, which is easily separated from the enriched REEs solution. REEs are then isolated and purified from the enriched solution to afford substantially pure individual REE by a ligand-assisted chromatography. In some other embodiments, the present invention discloses and claims articles of preparation including sodium silicate, silica gel, aluminum silicate, aluminum oxide, iron oxide, zeolites, as well as substantially pure rare earth metals. Additionally, a simplified process using one caustic extraction and one acidic extraction with an ion exchange process was also investigated and optimized to afford a comparable efficiency.

In some illustrative embodiments, the present invention relates to a process for preparing substantially pure chemicals from coal ash, the process comprising:

a. extracting coal ash with a first caustic solution at an elevated temperature;

b. separating undissolved solid residue from said first caustic extracting solution, wherein said first caustic solution is stored for later processing and said solid residue is washed briefly with water;

c. treating the water washed solid residue with a first acid, wherein pH of the resulting acidic solution is maintained at about 3 and then the leftover solid is separated and washed with water;

d. extracting the water washed solid with a second caustic solution at an elevated temperature;

e. separating undissolved solid residue from the second caustic extracting solution and washing briefly with water;

f. treating the undissolved solid with a second acid to bring the pH of the resulting acidic solution to about 3, and isolating the leftover solid as a substantially pure iron oxide with some aluminum silicate;

g. combining the acidic extraction solutions from steps c and f, and adjusting the pH to about 5 with a base whereby substantially pure aluminum silicate precipitates out from the solution as a product and the leftover solution containing enriched rare earth elements (REEs); and h. combining the first and the second caustic extracting solutions to recover substantially pure sodium silicate by pH adjustment.

In some illustrative embodiments, the present invention relates to a process for preparing substantially pure chemicals from coal ash as disclosed herein, the process further comprising steps of isolation and purification of each individual REE from said leftover acid extraction solution by a ligand-assisted chromatography comprising
   a. enriching by capturing said REEs on an ion exchange column;
   b. eluting REEs from said ion exchange column with a chelating ligand;
   c. binding said chelating ligand solution of REEs to an absorbent column;
   d. eluting individual REE with an isocratic or gradient of a ligand;
   e. combining fractions of pure individual REE separately; and
   f. recovering individual REE from the combined fractions.

In some illustrative embodiments, the present invention relates to a process for preparing substantially pure chemicals from coal ash as disclosed herein, the process further comprising a step of precipitating and recycling EDTA salt.

In some other illustrative embodiments, the present invention relates to a process for preparing substantially pure chemicals from coal ash, the process comprising:
   a. extracting coal ash with a caustic solution at an elevated temperature;
   b. separating undissolved solid residue from said caustic extraction solution and washing it briefly with water;
   c. treating the water washed solid residue with an acid at a ratio of solid to acid about 1:10 and then separating the leftover solid to afford an acidic extraction solution;
   d. loading the acidic extraction solution to a cation exchange column and collecting the pass-through eluent;
   e. treating the pass-through eluent with a base to pH about 3, at which point iron hydroxide precipitates out and is isolated; then bringing the pH of the solution up to about 8 whereby aluminum hydroxide precipitates out and is isolated; and
   f. eluting the loaded cation exchange column first with a solution of sodium chloride to afford fractions containing aluminum and iron, and then with a solution of a chelating ligand to afford fractions of enriched REEs;

In some other illustrative embodiments, the present invention relates to a process for preparing substantially pure chemicals from coal ash as disclosed herein, wherein the process further comprises steps of isolation and purification each individual REE from said fractions of enriched REEs, the steps comprising
   a. capturing said REEs on an ion exchange column,
   b. eluting REEs from said ion exchange column with a chelating ligand,
   c. binding said chelating ligand solution of REEs to an absorbent column,
   d. eluting individual REE with an isocratic or gradient of a ligand,
   e. combining fractions of pure individual REE separately, and
   f. recovering individual REE from the combined fractions.

In some other illustrative embodiments, the present invention relates to a process for isolation and purification each individual REE from said fractions of enriched REEs, the step further comprises a step of precipitating and recycling EDTA salt.

In some other illustrative embodiments, the present invention relates to a substantially pure product from coal ash manufactured according to the process as disclosed herein.

In some other illustrative embodiments, the present invention relates to a substantially pure product from coal ash manufactured according to the process as disclosed herein, wherein said product is substantially pure silica gel, sodium silicate, aluminum silicate, iron oxide, and rare earth elements.

Yet in other embodiments, the present invention discloses and claims articles of preparation including sodium silicate, silica gel, aluminum silicate, iron oxide, zeolites, as well as substantially pure aluminum and rare earth elements including, but not limited to, Samarium (Sm), Neodymium (Nd), and Praseodymium (Pr).

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 3 summarizes a process disclosed herein for the preparation of substantially pure chemicals, including sodium silicate, aluminum silicate, iron oxide, and REEs from coal ash.

FIG. 5B is a schematic flow diagram of the post-gelation process wherein aluminum and REEs are separated by precipitation (case A)

FIG. 5D is a schematic flow chart of the separation and purification process for the preparation of substantially pure sodium silicate, silica gel, iron oxide, and REEs from coal ash.

DETAILED DESCRIPTION

Figures 1A, 1B:
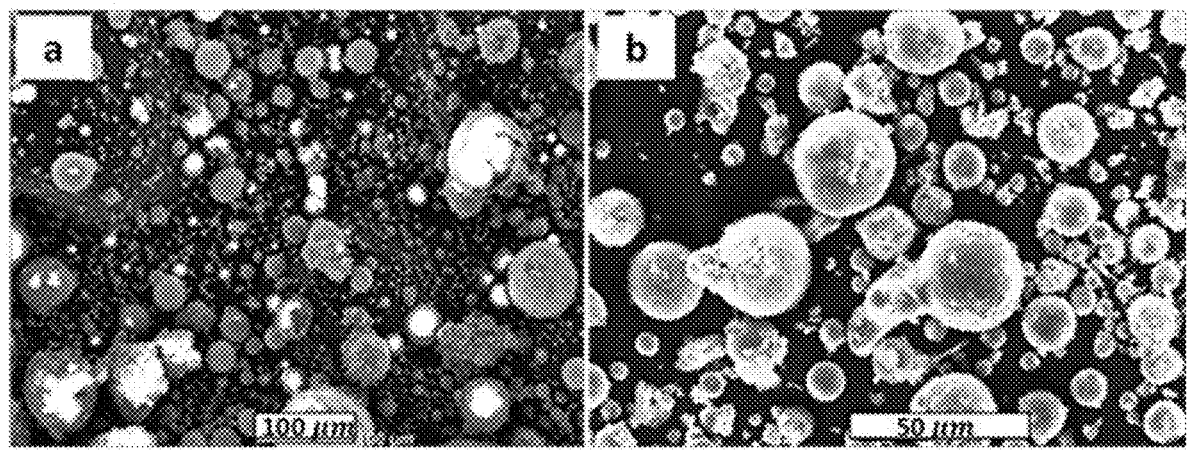
FIG. 1A shows a SEM images of original ash.
FIG. 1B shows the enlarged part of ash.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In some illustrative embodiment, the present invention discloses a process related to the preparation of useful chemicals, including rare earth elements (REEs, or rare earth metals), from massive industrial waste coal ash. The process includes dual caustic extractions of sodium silicate from coal ash at an elevated temperature. Following each caustic extraction, the solid residue is treated with an acidic solution to solubilize aluminum silicate and REEs. After removal of aluminum silicate from the acidic extraction solution by gelation at an elevated temperature or by precipitation through pH adjustment, rare earth metal ions are enriched and recovered from the acidic extraction solution in a capture and enrichment process with an ion exchange column. Substantially pure of each individual REE is further isolated and purified using a ligand-assisted chromatography. In other embodiments, the present invention discloses and claims articles of preparation including sodium silicate, silica gel, aluminum silicate, aluminum oxide, iron oxide, zeolites, as well as substantially pure rare earth metals.

In some illustrative embodiments, the present invention relates to a process for preparing substantially pure chemicals from coal ash, the process comprising:
  a. extracting coal ash with a first caustic solution at an elevated temperature;
  b. separating undissolved solid residue from said first caustic extracting solution, wherein said first caustic solution is stored for later processing and said solid residue is washed briefly with water;
  c. treating the water washed solid residue with a first acid, wherein pH of the resulting acidic solution is maintained at about 3 and then the leftover solid is separated and washed with water;
  d. extracting the water washed solid with a second caustic solution at an elevated temperature;
  e. separating undissolved solid residue from the second caustic extracting solution and washing briefly with water;
  f. treating the undissolved solid with a second acid to bring the pH of the resulting acidic solution to about 3, and isolating the leftover solid as a substantially pure iron oxide with some aluminum silicate;
  g. combining the acidic extraction solutions from steps c and f, and adjusting the pH to about 5 with a base whereby substantially pure aluminum silicate precipitates out from the solution as a product and the leftover solution containing enriched rare earth elements (REEs); and
  h. combining the first and the second caustic extracting solutions to recover substantially pure sodium silicate by pH adjustment.

In some illustrative embodiments, the present invention relates to a process for preparing substantially pure chemicals from coal ash as disclosed herein, the process further comprising steps of isolation and purification of each individual REE from said leftover acid extraction solution by a ligand-assisted chromatography comprising
   a. enriching by capturing said REEs on an ion exchange column;
   b. eluting REEs from said ion exchange column with a chelating ligand;
   c. binding said chelating ligand solution of REEs to an absorbent column;
   d. eluting individual REE with an isocratic or gradient of a ligand;
   e. combining fractions of pure individual REE separately; and
   f. recovering individual REE from the combined fractions.

In some illustrative embodiments, the present invention relates to a process for preparing substantially pure chemicals from coal ash as disclosed herein, the process further comprising a step of precipitating and recycling EDTA salt.

In some illustrative embodiments, the present invention relates to a process for preparing substantially pure chemicals from coal ash as disclosed herein, wherein the coal ash is fly ash.

In some illustrative embodiments, the present invention relates to a process for preparing substantially pure chemicals from coal ash as disclosed herein, wherein the second caustic extracting solution is the solution from the first caustic extraction.

In some illustrative embodiments, the present invention relates to a process for preparing substantially pure chemicals from coal ash as disclosed herein, wherein said caustic extracting solution is made of sodium hydroxide or potassium hydroxide.

In some illustrative embodiments, the present invention relates to a process for preparing substantially pure chemicals from coal ash as disclosed herein, wherein the concentration of the caustic extracting solution is from about 1 M to about 15 M, preferably from about 5 M to 12 M.

In some illustrative embodiments, the present invention relates to a process for preparing substantially pure chemicals from coal ash as disclosed herein, wherein said acid is hydrochloric acid, sulfuric acid, or nitric acid.

In some illustrative embodiments, the present invention relates to a process for preparing substantially pure chemicals from coal ash as disclosed herein, wherein the concentration of said acid is from about 0.01 M to about 12 M, preferably from about 0.1 to 5 M.

In some illustrative embodiments, the present invention relates to a process for preparing substantially pure chemicals from coal ash as disclosed herein, wherein the elevated temperature is from about 50° C. to about 250° C., preferably from about 80° C. to about 150° C.

In some illustrative embodiments, the present invention relates to a process for preparing substantially pure chemicals from coal ash as disclosed herein, wherein the mass ratio of coal ash to base of said caustic solution is from about 1:1 to about 1:10.

In some illustrative embodiments, the present invention relates to a process for preparing substantially pure chemicals from coal ash as disclosed herein, wherein said sodium silicate from caustic extraction is acidified to afford silica gel.

In some illustrative embodiments, the present invention relates to a substantially pure product from coal ash manufactured according to the process as disclosed herein.

In some illustrative embodiments, the present invention relates to a substantially pure product from coal ash manufactured according to the process as disclosed herein, wherein said product is substantially pure silica gel, sodium silicate, aluminum silicate, iron oxide, or ram earth elements.

In some other illustrative embodiments, the present invention relates to a process for preparing substantially pure chemicals from coal ash, the process comprising:
   a. extracting coal ash with a caustic solution at an elevated temperature;
   b. separating undissolved solid residue from said caustic extraction solution and washing it briefly with water;
   c. treating the water washed solid residue with an acid at a ratio of solid to acid about 1:10 and then separating the leftover solid to afford an acidic extraction solution;
   d. loading the acidic extraction solution to a cation exchange column and collecting the pass-through eluent;
   e. treating the pass-through eluent with a base to pH about 3, at which point iron hydroxide precipitates out and is isolated; then bringing the pH of the solution up to about 8 whereby aluminum hydroxide precipitates out and is isolated; and
   f. eluting the loaded cation exchange column first with a solution of sodium chloride to afford fractions containing aluminum and iron, and then with a solution of a chelating ligand to afford fractions of enriched REEs;

In some other illustrative embodiments, the present invention relates to a process for preparing substantially pure chemicals from coal ash as disclosed herein, wherein the process further comprises steps of isolation and purification each individual REE from said fractions of enriched REEs, the steps comprising
   a. capturing said REEs on an ion exchange column,
   b. eluting REEs from said ion exchange column with a chelating ligand,
   c. binding said chelating ligand solution of REEs to an absorbent column,
   d. eluting individual REE with an isocratic or gradient of a ligand,
   e. combining fractions of pure individual REE separately, and
   f. recovering individual REE from the combined fractions.

In some other illustrative embodiments, the present invention relates to a process for isolation and purification each individual REE from said fractions of enriched REEs, the step further comprises a step of precipitating and recycling EDTA salt.

In some other illustrative embodiments, the present invention relates to a process for preparing substantially pure chemicals from coal ash as disclosed herein, wherein the process further comprises a step of washing coal ash with a strong, dilute acid to remove calcium oxide and other salts of alkali earth metals before extracting with a caustic solution at an elevated temperature.

In some other illustrative embodiments, the present invention relates to a process for preparing substantially pure chemicals from coal ash as disclosed herein, wherein the process further comprises a step of exposing the leftover solid from acid extraction to a magnetic field and collecting those materials attracted to said magnetic field as an iron-enriched product.

In some other illustrative embodiments, the present invention relates to a process for preparing substantially pure chemicals from coal ash as disclosed herein, wherein the process further comprises a step of acidifying said caustic extraction solution to afford substantially silica gel.

In some other illustrative embodiments, the present invention relates to a process for preparing substantially pure chemicals from coal ash as disclosed herein, wherein the caustic extracting solution is made of sodium hydroxide or potassium hydroxide.

In some other illustrative embodiments, the present invention relates to a process for preparing substantially pure chemicals from coal ash as disclosed herein, wherein the caustic extracting solution has a concentration from about 1 M to about 15 M, preferably from about 5 M to 12 M.

In some other illustrative embodiments, the present invention relates to a process for preparing substantially pure chemicals from coal ash as disclosed herein, wherein the acidic extraction solution is made of an acid selected from the group consisting of hydrochloric acid, sulfuric acid, and nitric acid.

In some other illustrative embodiments, the present invention relates to a process for preparing substantially pure chemicals from coal ash as disclosed herein, wherein the acidic extraction solution has a concentration from about 0.1 M to about 12 M, preferably from about 1 M to about 5 M.

In some other illustrative embodiments, the present invention relates to a process for preparing substantially pure chemicals from coal ash as disclosed herein, wherein said elevated temperature is from about 50° C. to about 250° C., preferably from about 80° C. to about 150° C.

In some other illustrative embodiments, the present invention relates to a substantially pure product from coal ash manufactured according to the process as disclosed herein.

In some other illustrative embodiments, the present invention relates to a substantially pure product from coal ash manufactured according to the process as disclosed herein, wherein said product is substantially pure silica gel, sodium silicate, aluminum silicate, iron oxide, and ram earth elements.

In other embodiments, the present invention discloses and claims articles of preparation including sodium silicate, silica gel, aluminum silicate, iron oxide, zeolites, as well as substantially pure aluminum and rare earth elements including, but not limited to, Samarium (Sm), Neodymium (Nd), and Praseodymium (Pr).

In the present disclosure, the term "about" can allow for a degree of variability in a value or range, for example, within 20%, within 10%, within 5%, or within 1% of a stated value or of a stated limit of a range.

In the present disclosure, the term "substantially" can allow for a degree of variability in a value or range, for example, within 70%, within 80%, within 90%, within 95%, or within 99% of a stated value or of a stated limit of a range.

On average, burning of each ton of coal generates about 0.1 tons of ash, in the absence of limestone, which is added in fluidized bed combustion processes for sulfur removal (Kashiwakura, S. et al., Open J. Phys. Chem. 2013, 3, 69-75). The added limestone can increase the amount of coal ash generated (National Research Council. Managing coal combustion residues in mines. The National Academies Press, 2006). The data collected to date are obtained from the fly ash generated from combustion of pulverized coal, or PC fly ash, or class F fly ash, which is rich in $SiO_2$, $Al_2O_3$, and $Fe_2O_3$, and has small amounts of other oxides.

The content of REEs and trace metals in coal fly ash is highly dependent on the source coal and the combustion technology. The pulverized coal (PC) fly ash used in this study was generated at Miami Fort Generating Station (North Bend, Ohio) and obtained from FlyAshDirect, Waste Management. Inductively-Coupled Plasma Mass Spectrometry (ICP-MS) analysis shows that the PC fly ash sample has a higher total REE content (709 ppm, Table 1) than that of a standard reference material of NIST (SRM 1633c). A unit of SRM 1633c consists of 75 g of powdered coal fly ash, which is derived from western Pennsylvania bituminous coal. Typical trace metal composition of PC fly ash is compared with that of the NIST SRM 1066c in Table 2.

The inductively coupled argon plasma mass spectrometry (ICP-MS) have been used for analyzing the rare earth elements in the ash samples, and the samples from the inlet and outlet stream of each step. In ICP-MS, the sample is introduced into a high-temperature argon plasma (about 10,000 K) through a nebulizer in a stream of flowing argon as a finely divided aerosol. The sample is rapidly desolvated, vaporized, and ultimately atomized. The resulting atoms are then ionized as singly charged ions, then mass analyzed and detected. The ICP-MS method at Purdue was calibrated by analyzing the NIST Standard reference material 1633c and the results agree closely with the NIST certified values for this material.

TABLE 1

ICP-MS analysis of REE contents (ppm) of the PC fly ash used in this study and the literature values reported for NIST Fly Ash

| ppm | La | Ce | Pr | Nd | Sm | Eu | Gd | Tb | Dy | Yb | Lu | Sc | Y | Total |
|---|---|---|---|---|---|---|---|---|---|---|---|---|---|---|
| PC Fly Ash | 93 | 180 | 44 | 114 | 43 | 17 | 17 | 5 | 16 | 10 | | 98 | 72 | 709 |
| NIST Ash* | 87 | 180 | 11 | 87 | 19 | 5 | | 3 | 19 | 8 | 1 | 38 | | 458 |

*NIST Standard Reference Material 1633c for coal fly ash

TABLE 2

Selected trace metal content (ppm) of the NIST fly ash (SRM 1633c) and the medium values of a typical PC fly ash (National Research Council. Managing coal combustion residues in mines. The National Academies Press, 2006).

| ppm | As | Ba | Cd | Cr | Co | Cu | Pb | Mn | Ni | Sr | V | Zn |
|---|---|---|---|---|---|---|---|---|---|---|---|---|
| NIST Ash | 187 | 1,120 | 0.79 | 217 | 44 | 170 | 95.2 | 243 | 129 | 901 | 285 | 245 |
| PC Fly Ash | 43 | 806 | 3.4 | 136 | 36 | 112 | 56.8 | 250 | 77.6 | 775 | 252 | 148 |

To recover REEs from fly ash, which contains typically from 300 to 1,000 ppm of REEs, is inherently expensive, as expected from the well-known Sherwood principle. The lower the concentration of the target component in the crude, the more expensive it is to produce a pure product. Producing valuable byproducts is required to make the production of REEs from coal ash economically feasible. PC fly ash in general has about 50 wt. % $SiO_2$ and 27 wt. % $Al_2O_3$, having a Si/Al molar ratio of 1.6. If these two chemicals are recovered from coal fly ash in pure form, they can be made into various zeolites. Zeolite Y, for example, has a Si/Al molar ratio of 1.5 or higher, and it is widely used in catalytic cracking (Liu, Z, et al., J. Nanotechnol. 2016, 2016, 1-6).

Rare earth elements (REEs) are widely used in catalysts, magnets, fluorescent lamps, photodiodes, hybrid vehicles, and many other high technology products (Haque, N. et al., Resources, 2014, 3, 614-635). China currently produces over 95% of the world's rare earth supply, while the US relies on imports of REEs from China. It is crucial for the US to increase domestic REE production and to manage the life cycle of REEs, which includes replacing REEs with other elements, reducing usage, and increasing recycling.

Advanced separation technologies can transform the production and the life cycle of REEs. They are essential for isolating REEs from ores or other sources and for recycling the materials from wastes. The United States was reported to have 13 million metric tons of rare earth deposits in Colorado, Nebraska, Alaska, Wyoming, New York, and many other states. To obtain high-purity (>99%) REEs from the deposits, however, is challenging and requires many purification steps, because many different rare earth elements coexist at low concentrations (<1,000 ppm) in complex ores with highly variable compositions.

The current production of high-purity REEs in China is mainly based on the extraction technologies developed in the 1950's. A typical production process consists of the following steps: (1) physical separations (gravity concentration, flotation, magnetic, or electrostatic separation), which are used to separate rare earth minerals from sands and rocks in the ore; (2) dissolution of rare earth minerals in acids or caustic solutions; (3) separation of each element from the mixture solutions; (4) precipitation of a rare earth element using oxalic acid to obtain solid rare earth oxalate, which is then decomposed under heat to form rare earth oxide of a single element. Among all the steps, Step 3 for purification is the most difficult step because many of the 17 ram earth elements are present in the solution, and they have similar chemical properties, ionic size, and charge. More than 20 extraction steps in series and in parallel using organic solvents (naphthenic acid or phosphorous-based extractants) and reverse extraction steps (using hydrochloric or sulfuric acid) are needed to separate the rare earth elements into eight or ten major fractions. Finally, precipitation and ion exchange steps were used for separating the fractions into pure elements (Haque, N. et al., 2014; Ling, L., J. Chromatogr. A, 2015, 1389, 28-38).

The solvent extraction steps require large amounts of organic extractants and highly acidic or caustic aqueous solutions. Additional steps are also required to separate the metal ions from the extractants. Over a thousand mixer settler units are required, resulting in a large footprint and generating a large amount of waste. Current purification processes to produce high-purity rare earth elements are expensive, inefficient, not adaptable to different feed compositions, and not environmentally sustainable.

As reported by DOE's National Energy Technology Laboratory (NETL), many domestic coals and byproducts of coal processing or utilization can contain from 1,000 to 10,000 ppm REEs, which is similar to those in REE rich ores (Seredin, V. V., Int. J. Coal Geol, 2012, 94, 67-93). Central Appalachian coal, for example, has similar REE contents as the best REE ores of Mountain Pass or Chinese Lateritic ore. The byproducts of coal processing (coal refuse, pit cleanings, tailings) or coal utilization (pulverizer rejects, fly ash, bottom ash) of REE rich coals am attractive sources of REEs, because their disposal or discharge can cause harm to the environment. Coal combustion enriches REE content in ash, which can be as high as 10,000 ppm (Haque, N. et al, 2014). The US in 2014 produced 129 million metric tons of ash, which includes about 50 million tons of fly ash (Taggart, R. K., et al., Environ. Sci. Technol. 2016, 50; National Research Council. Managing coal combustion residues in mines. The National Academies Press, 2006). About 48% of the ash was recycled, and the rest was stored in ponds or landfills. The US has half a billion tons of fly ash stored or landfilled. The fly ash contains from 300 to 10,000 ppm (1 wt. %) REEs. If a fraction of the REEs in coal fly ash could be recovered and purified from fly ash, the amounts could meet the US demand of REEs for decades. FIGS. 1A-1B show a picture of common coal ash.

In addition to solving the critical REE supply problem, there are many advantages of recovering REEs from coal fly ash: (1). The feedstock cost is low. Currently many coal power plants pay from $10 to $15 to dispose of 1 ton of coal ash. (2). The average particle size of fly ash is less than 100 microns, which are sufficiently small for efficient processing. (3). Unlike the mining method for REE production, there is no need for excavation, physical separation, pulverization, or grinding of the ash before REE recovery and processing. For this reason, recovery of REEs from coal fly ash can reduce energy consumption and $CO_2$ emissions by 75% compared to the conventional mining method (National Research Council. Managing coal combustion residues in mines. The National Academies Press, 2006). (4). REEs and heavy metals can be removed from coal ash during processing, reducing the risk to the environment. (5) Valuable byproducts can be recovered from coal ash, making the overall process economical as discussed below.

In a recent patent, two-phase extraction and magnetic separations have been proposed for the recovery of a mixture of REEs from fly ash (Joshi, P. B., et al., US 20130287653 A1). However, the literature method is based on liquid-liquid extraction, which has low mass transfer efficiency, resulting in low yield and high cost. Furthermore, their method generates large amounts of organic solvent wastes, which are difficult to recycle and must be incinerated. More important, the method produces a mixture of REEs, not high-purity REE products.

Figure 2:
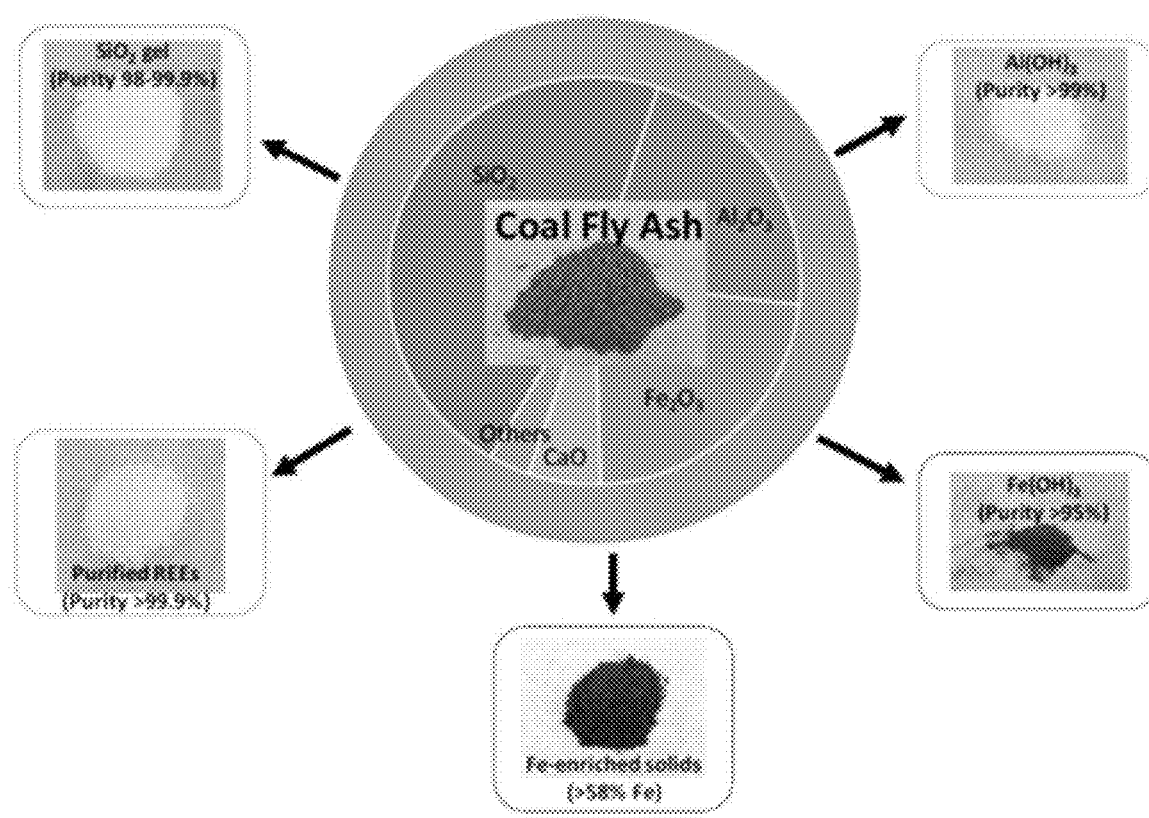
FIG. 2 shows some of the final products isolated from coal ash.

Recently, we developed a breakthrough technology to recover a crude mixture of REEs from coal fly ash together with industrially useful materials (Ling, L, et al., J. Chromatogr. A 2015, 1389, 28-38). As shown in FIG. 2, this process produces substantially pure silicon dioxide ($SiO_2$), aluminum oxide ($Al_2O_3$), sodium silicate and aluminum silicate. The data obtained from bench-scale experiments (100 g ash processed per day) show that about 90% of REEs in the fly ash were recovered. In the same process, 99% of silicon dioxide and 67% aluminum dioxide were converted to sodium silicate and aluminum silicate. Iron oxide ($Fe_2O_3$) was also obtained as a byproduct. The developed technology (FIG. 3) employs a combination of caustic dissolution, and acid extraction to obtain a crude mixture of REEs, which can be further separated from major components and purified using ligand-assisted elution or displacement chromatography developed recently. We showed that a ternary mixture of Pr, Nd, and Sm (6 mM each) can be separated into three high-purity REEs using ligand-assisted elution chromatography. Our recent results also showed that ligand-assisted displacement chromatography potentially can be even more economical than ligand-assisted elution purification. Cost analysis based on the preliminary data shows that this process has potential to be profitable and high-purity REEs can be obtained economically from coal fly ash.

Figure 4:
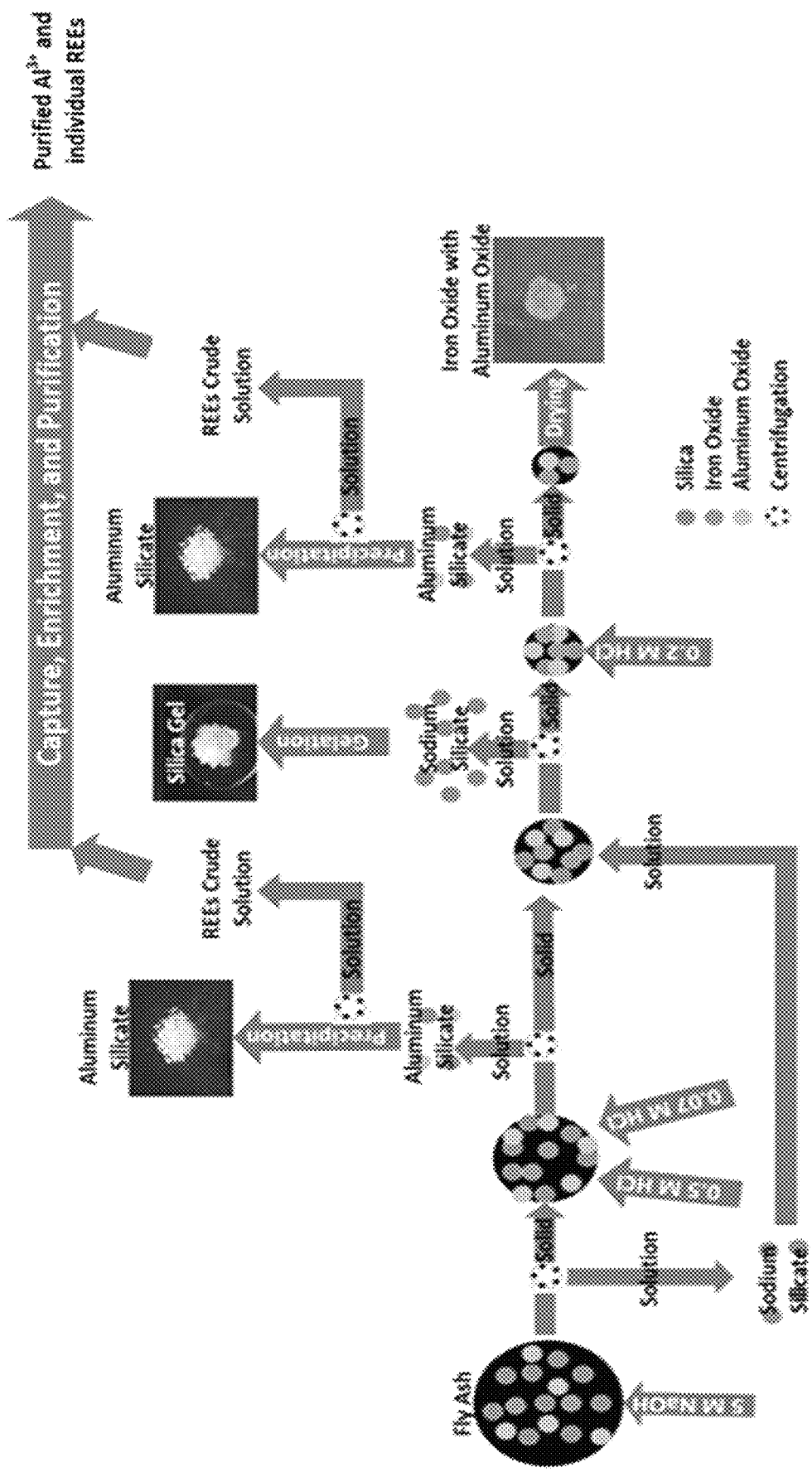
FIG. 4 is a simplified schematic flow diagram of the separation process wherein aluminum silicate is recovered using a precipitation method by pH adjustment.
Figure 5A:
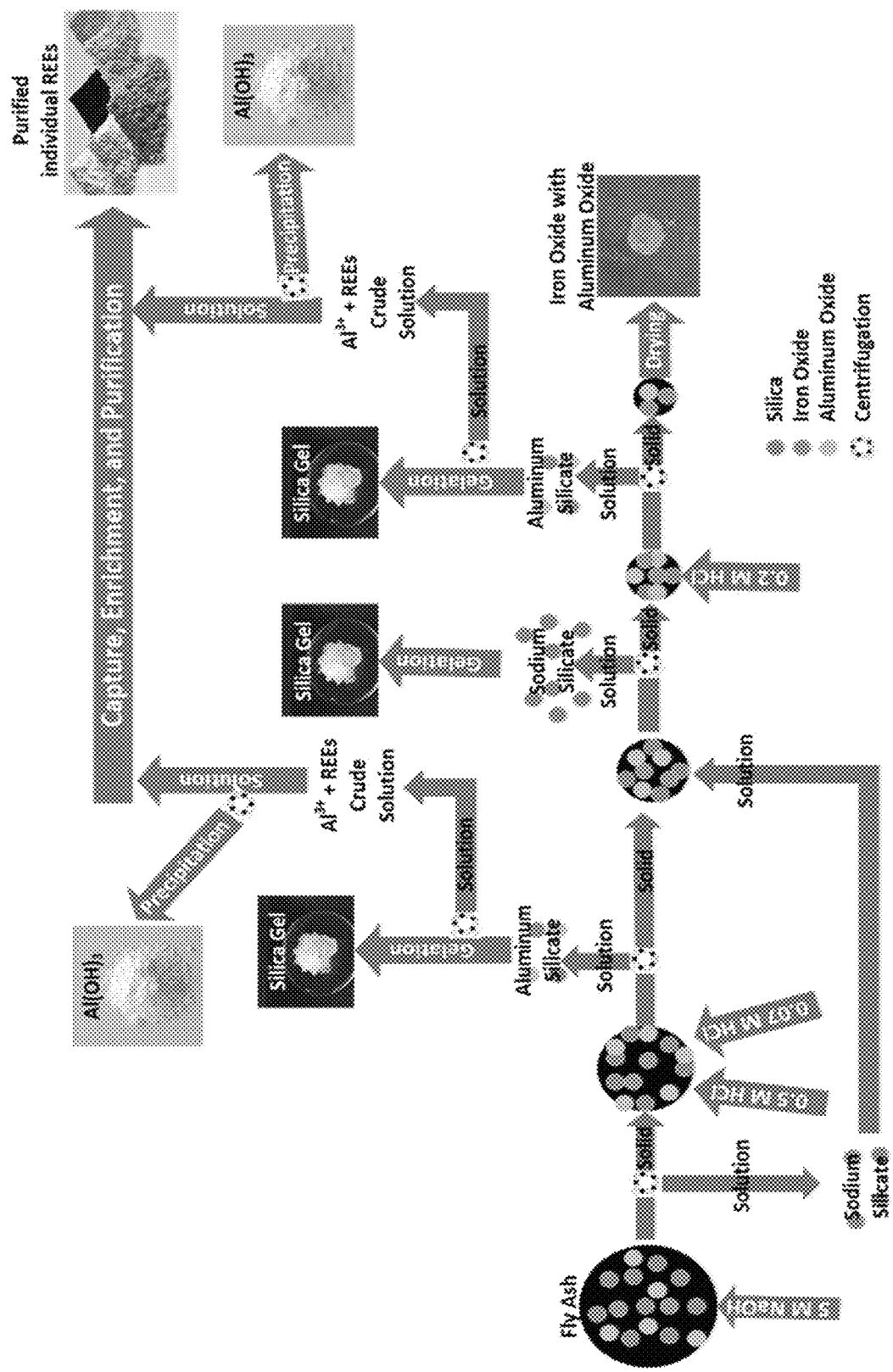
FIG. 5A is a schematic flow diagram of the separation process wherein a gelation process is employed to prepare silica gel from the acid extraction solution.

The method disclosure herein can recover a crude mixture of REEs in a matter of several hours. At the same time, substantially pure sodium silicate, silica gel, aluminum silicate, aluminum hydroxide, or alumina can be produced. A simplified schematic process is shown in FIG. 4 and FIG. 5A. The fly ash is boiled in a sodium hydroxide solution of 5 M to dissolve some of the silicon dioxide and to form aluminum silicate on the surface of the ash particles, which does not dissolve in the NaOH solution. The sodium silicate solution is removed and the residual solid is washed with water. An acidic solution is used to dissolve the layer of aluminum silicate on the surface of the particles. The pH of the resulting acidic solution mixture is maintained at 3, since a pH value lower than 3 intends to solubilize more iron oxide and reduce the efficiency of this process. REEs and some other metal ions also dissolve in the acidic environments. The solid is washed again using a more diluted acidic solution to increase the yield of REEs and pure aluminum silicate, while minimizing dissolution of any iron oxide.

To increase the yield of the process, the remaining solid is washed with water and boiled again in the 5 M NaOH, which contains the sodium silicate dissolved in the previous cycle. The acid wash step is repeated to increase the yield of aluminum silicate and REEs. After two cycles, this process can achieve about 100% conversion of the silicon dioxides in fly ash to high-purity sodium silicate and aluminum silicate. About 70% of the aluminum in the fly ash is converted to aluminum silicate, which is recovered as a precipitate after the pH is adjusted to 5.

Figure 5C:
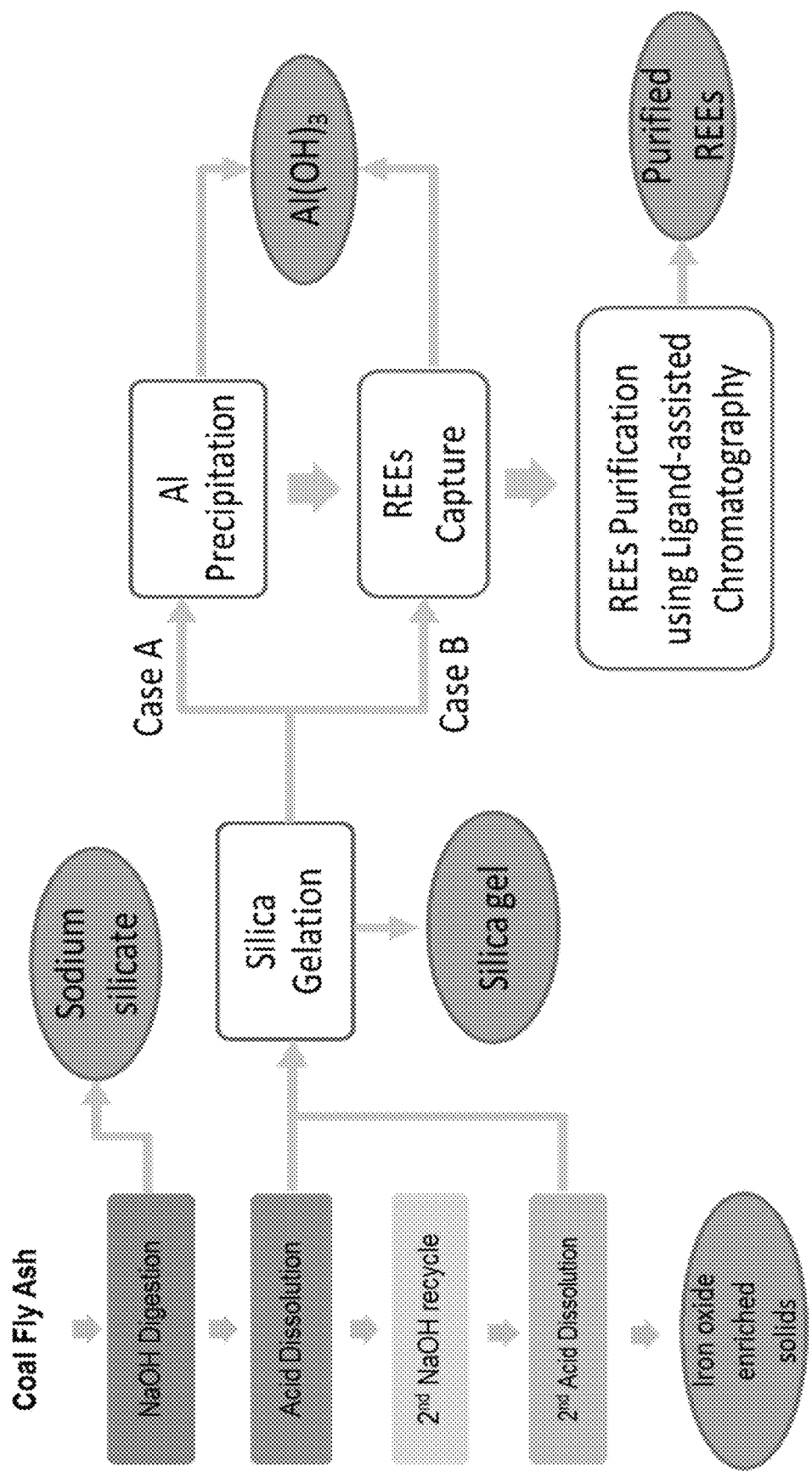
FIG. 5C shows a schematic flow diagram of the post-gelation process wherein aluminum and REEs are separated by cation exchange and ligand assisted elution of REEs (case B).
Figure 6A:
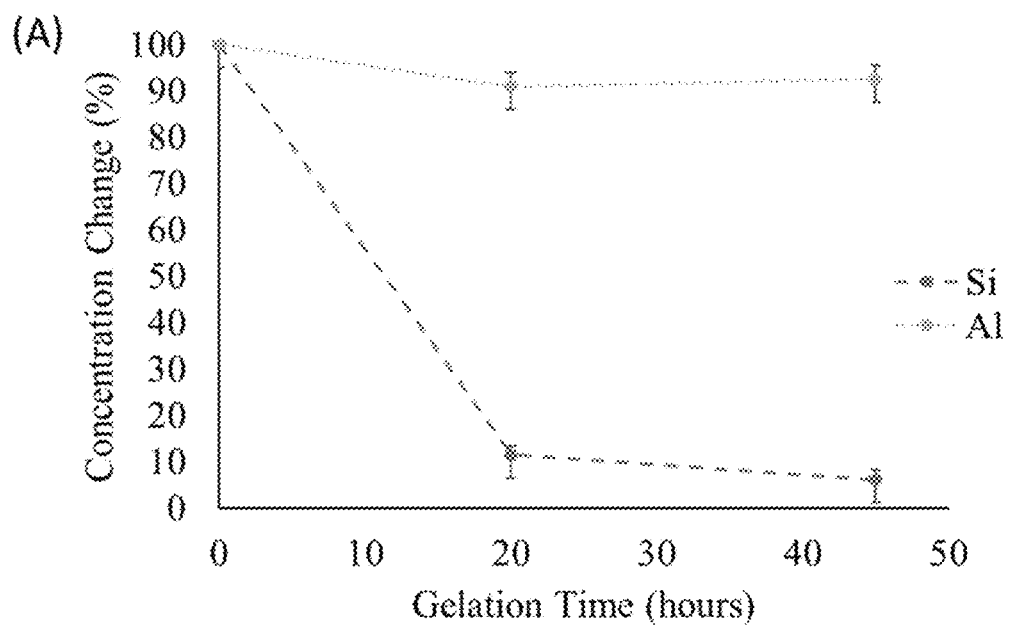
FIG. 6A represents a concentration change of major components (Si and Al) and REEs during gelation.
Figure 6B:
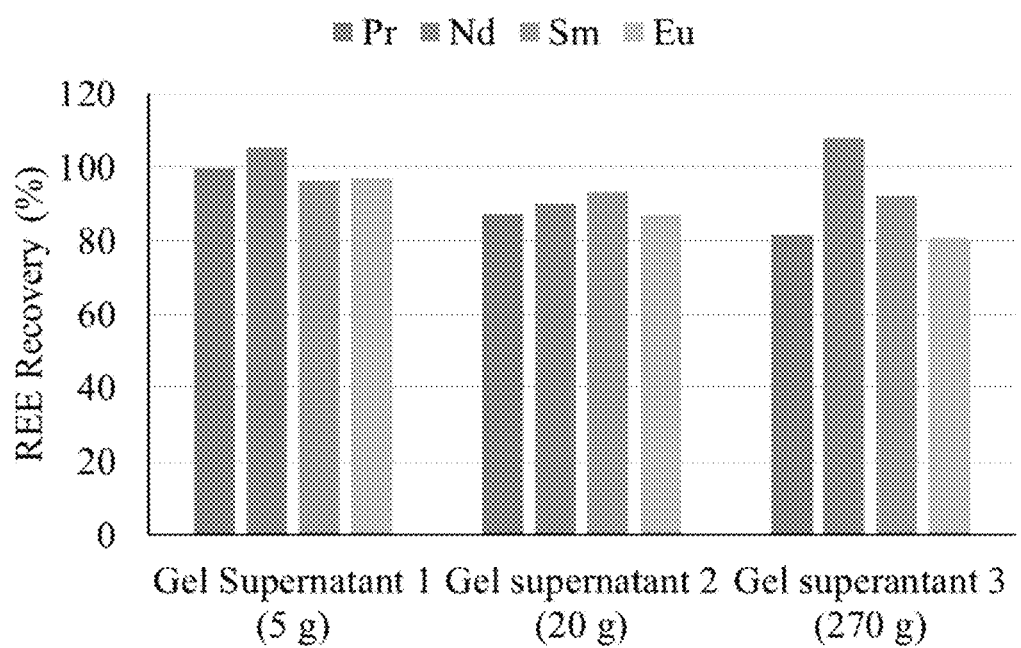
FIG. 6B shows REE recovery rates at various scales.
Figure 7:
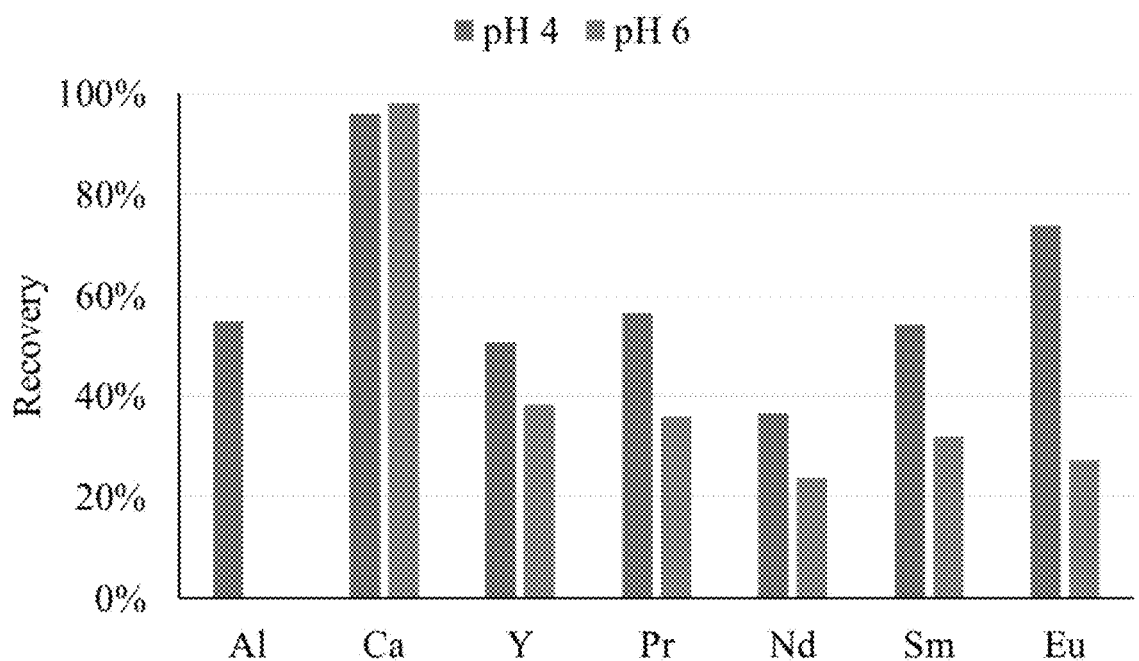
FIG. 7 represents a concentration change of REEs after aluminum precipitation step
Figure 8:
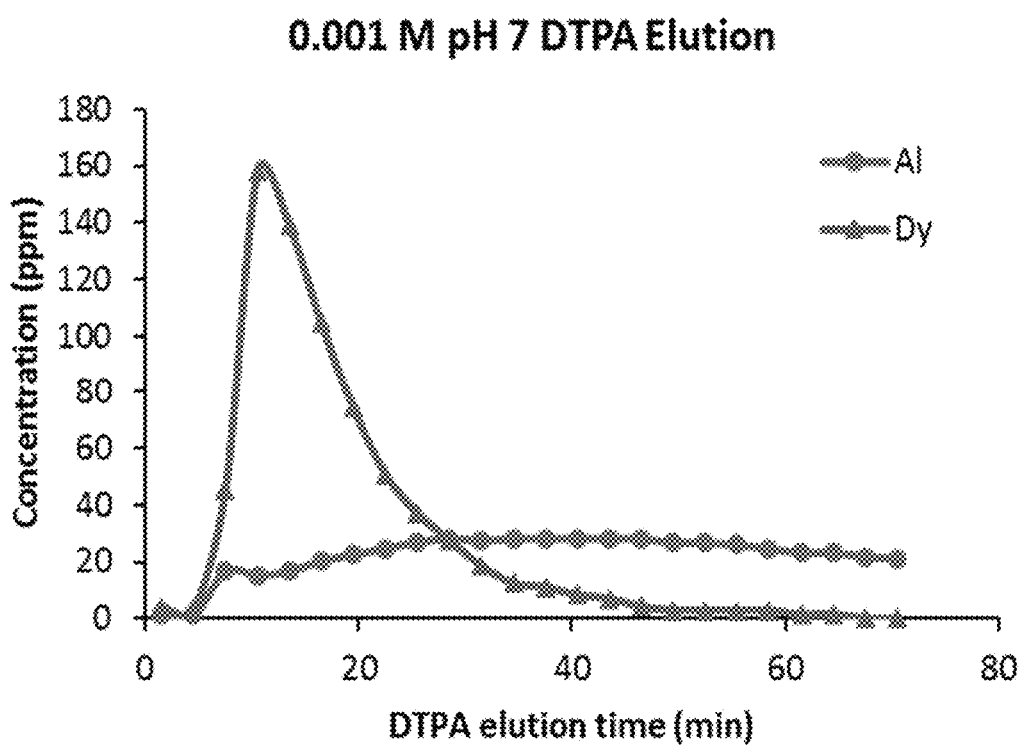
FIG. 8 represents a separation or REEs from Al using cation exchange column and ligand-assisted elution of REE

The data show that more than 90% of the REEs in the fly ash are recovered during the acidic solubilization solution (pH 3) together with aluminum silicate. By adjusting the solution pH to 7, aluminum silicate precipitates out and most of the REEs remain in solution. The aluminum silicate can be precipitated by adding NaOH or the silica gel was produced at an elevated temperature. Those products can be sold as products or added to the NaOH solution containing sodium silicate to make zeolites. The REEs in the weak acid solution, which also contains some other cations, can be captured in an ion exchange column (e.g. DOWEX 50W X8). If silica gel is produced, additional separation process for aluminum recovery is required for efficient REEs isolation (FIG. 5B and FIG. 5C). The results in FIGS. 6A-6B show that after the formation of silica gel, most of the aluminum ions and REEs remain in solution. After separating silica gel, the leftover solution containing aluminum and REEs can be either reacted with NaOH to produce aluminum hydroxide (case A, FIG. 5B) or transferred to a cation exchange column to capture all REE and Al (case B, FIG. 5C) as shown in FIG. 5D. In case A, the precipitated aluminum hydroxide can be separated while the leftover solution containing REE can be captured in a cation exchange column. The results in FIG. 7 show that some REEs are lost during the aluminum precipitation step in the pH range from pH 4 to pH 6 for Case A. In case B, the aluminum ions and REEs are captured in the column and then eluted by a ligand that has a high selectivity for REEs over aluminum ions. The results in FIG. 8 show that a dilute DTPA solution can selectively elute an REE (Dy) from the cation exchange column. The REE fraction contains only a small amount of aluminum ions. Most of the aluminum ions are captured in the cation exchange column, and can be eluted using a concentrated NaCl solution. The eluted ligand-REEs and ligand-Al fractions can be transferred to another cation exchange columns (loaded with $H^+$ ions) to capture REEs or the residual aluminum ions in the column. Since the ligand prefers $H^+$, it releases REE and aluminum ions in the cation exchange column. The ligand in the acid form can be recycled.

Captured REEs can be eluted using a solution of ligands which has high affinity to REEs (Ling, L., et al., 2015; Hower, J. C., et al., *Coal Combust. Gasif Produ.* 2013, 5, 73-78; Spedding, F. H., et al., *J. Am. Chem. Soc.* 1950. 72, 2354=23562 (1950). Most of the heavy metal ions are expected to be recovered in the solution containing REEs, but they will be separated from REEs in subsequent concentration and purification processes using a ligand-assisted chromatography. As shown in our previous studies, the REEs in the EDTA solution can be separated into high-purity REE fractions using ligand-assisted elution chromatography (Ling L., et al., 2015). The EDTA of the pure fractions can be precipitated by adding oxalic acid such that the pure REE oxalates can be collected and the leftover EDTA solution is recycled to elute captured REEs (FIG. 5D). These REE oxalate salts can be calcined to produce pure REE oxides.

Figure 9:
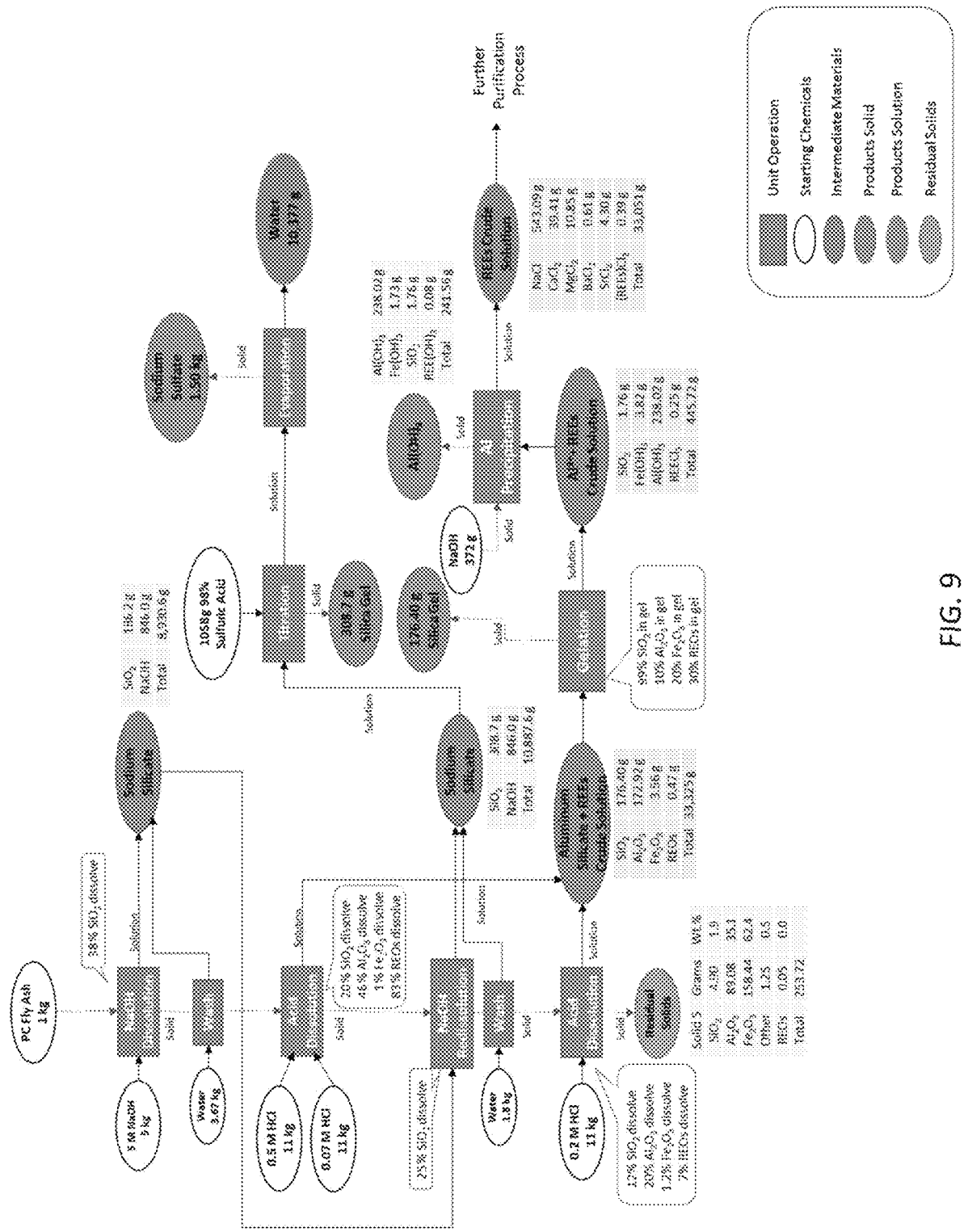
FIG. 9 represents a detailed production process with mass balance information for the preparation of substantially pure chemicals, sodium silicate, silica gel, aluminum hydroxide, iron oxide, and REEs from coal ash.

The AAS (Atomic absorption spectroscopy) results indicated that the aluminum silicate recovered from the precipitation process is highly pure, and can be added to the NaOH solution containing pure sodium silicate solution for zeolite synthesis (Beck, D, W, U.S. Pat. No. 3,130,007). Since the fly ash is rich in silica, no additional aluminum oxide is needed for the synthesis of Zeolite Y. For the synthesis of other zeolites, additional aluminum oxide will be needed. The REE crude mixture in FIG. 9 may contain Na, K, Ca, Mg, heavy metal ions and other trace metal ions. These impurities can be removed using a batch ion exchange or a continuous ion exchange process.

Materials and Methods of Characterization

The coal fly ash used in this study was generated at Miami Fort Generating Station (North Bend, Ohio). Sodium hydroxide (NaOH) and sodium chloride (NaCl) were purchased from Mallinckrodt Baker. Hydrochloric acid (HCl), nitric acid (HNO3), copper sulfate (CuSO4), erbium nitrate pentahydrate (Er(NO3)3·5H2O), diethylcnetriaminepentaacetic acid (DTPA), ethylenediaminetetraacetic acid (EDTA), and calcium hydroxide (Ca(OH)2) were purchased from Sigma-Aldrich. Distilled deionized water (DDW) was obtained from a Millipore four stage cartridge system. The strong cation exchange resin, AG-MP50 resin (100-200 mesh), was purchased from Bio-rad. Millipore glass column (1.16 cm ID and 100 cm Lc) and Omnifit column (1 cm ID and 10 cm Lc) used for sorbent packing were purchased from VWR International.

Elemental analysis of major components was conducted using an Atomic Absorption Spectroscopy (AAS) (AAnalyst 300, Perkin Elmer) and Scanning Electron Microscopy—Energy Dispersive X-ray Spectroscopy (SEM-EDS) (JCM-6000PLUS, JEOL). The REEs concentration was analyzed using an Inductively Coupled Plasma Mass Spectroscopy (ICP-MS) (Element 2, Thermo Finnigan) with the standard addition method. For REEs elemental analysis, the ash samples (0.5 g) were dissolved in 30% hydrofluoric acid (10 g) to dissolve all components except the hydrocarbons. The solution is followed by a heat-up process to vaporize all the liquid so that white precipitates could be collected. The white precipitates were dissolved in a mixture of 33% HCl (30 g) solution and 30% hydrogen peroxide (5 g). The acid solution dissolving the white precipitates was diluted with 2% nitric acid and then analyzed to measure the concentrations of REEs using TCP-MS.

X-ray diffraction (XRD) patterns were obtained using Rigagku SmartLab X-Ray with CuKα radiation (40 kV 40 mA). Chromatography experiments were performed using a Ä KTA explorer 100 (GE Healthcare). Effluent fractions were collected and analyzed by AAS. The average pore size and surface area of silica gel products was measured using BET analysis (NOVA 2200e, Quantachrome).

Ligand-Assisted Elution Purification of REEs

Figure 10A:
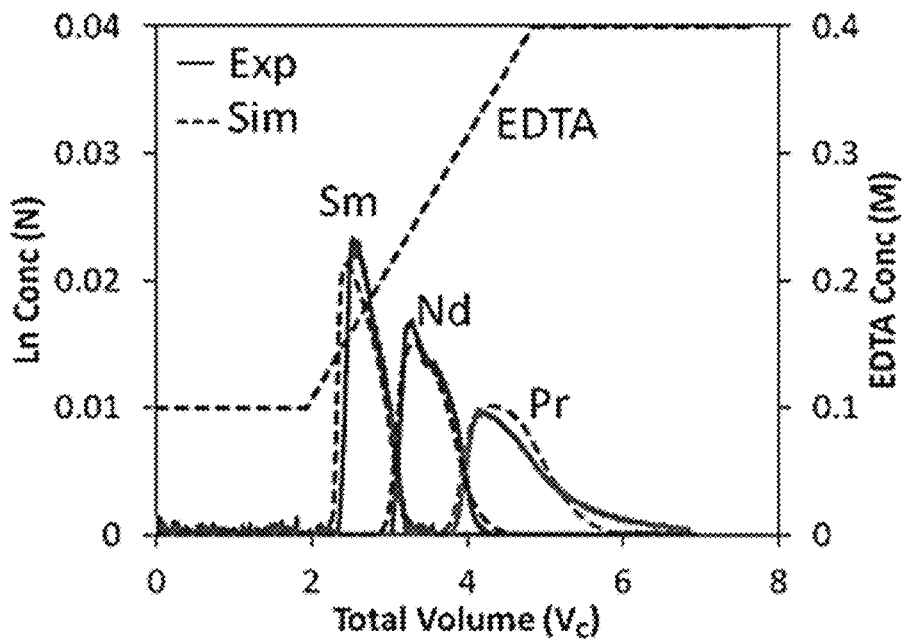
FIG. 10A shows ligand-assisted elution chromatographic separation of Pr, Nd, and Sm using a linear gradient elution.
Figure 10B:
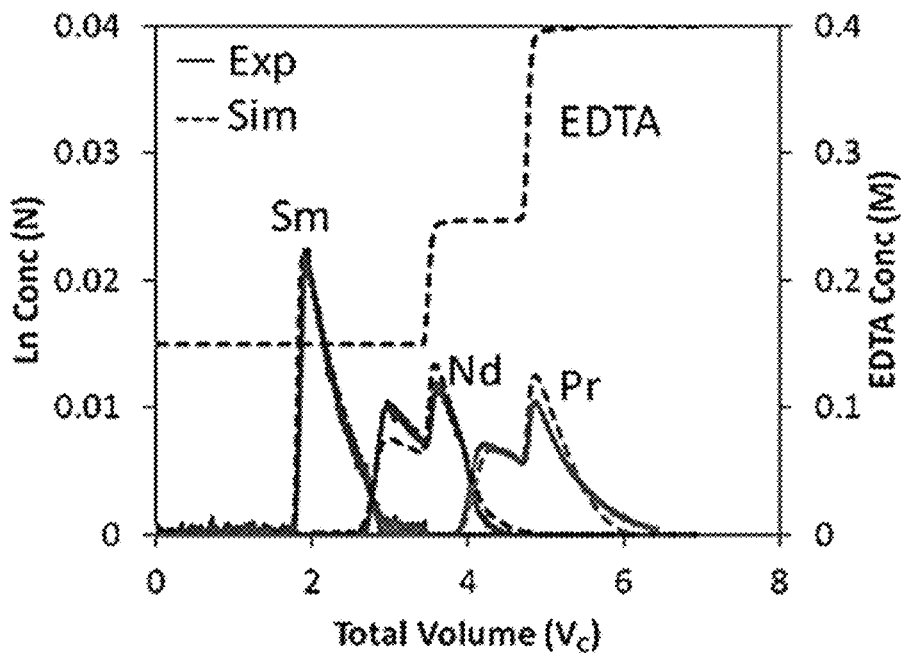
FIG. 10B shows ligand-assisted elution chromatographic separation of Pr, Nd, and Sm using a step-wise elution.

The ions of the adjacent REEs have the same valence and very little differences in size. They cannot be separated using conventional ion exchange or adsorption processes. We developed recently a ligand-assisted elution chromatography process for the separation of REEs using a robust inorganic sorbent, titania, which has three types of adsorption sites: Brønsted acid (BA), Brønsted base (BB), and Lewis acid (LA). At a high pH, the BA sites (TiOH) can interact with the lanthanides as a cation exchanger. If a ligand is preloaded onto the sorbent, the COO⁻ groups of the ligand can adsorb onto the LA sites (Ti). The adsorbed ligands become strong adsorption sites for the REEs. Theoretical analysis indicates that if the Langmuir a value for REEs adsorption is similar to that of REEs complexation with the ligand in the mobile phase, the REEs can be eluted separately with an overall selectivity that is equal to the ratio of the ligand selectivity to the sorbent selectivity. The elution separation was tested using a ternary mixture of praseodymium (Pr), neodymium (Nd), and samarium (Sm) using ethylenediaminetetraacetic acid (EDTA) as the ligand. The purity and yield for all components were above 95% in linear gradient elution and stepwise elution (FIG. 10, Table 3).

Figure 11:
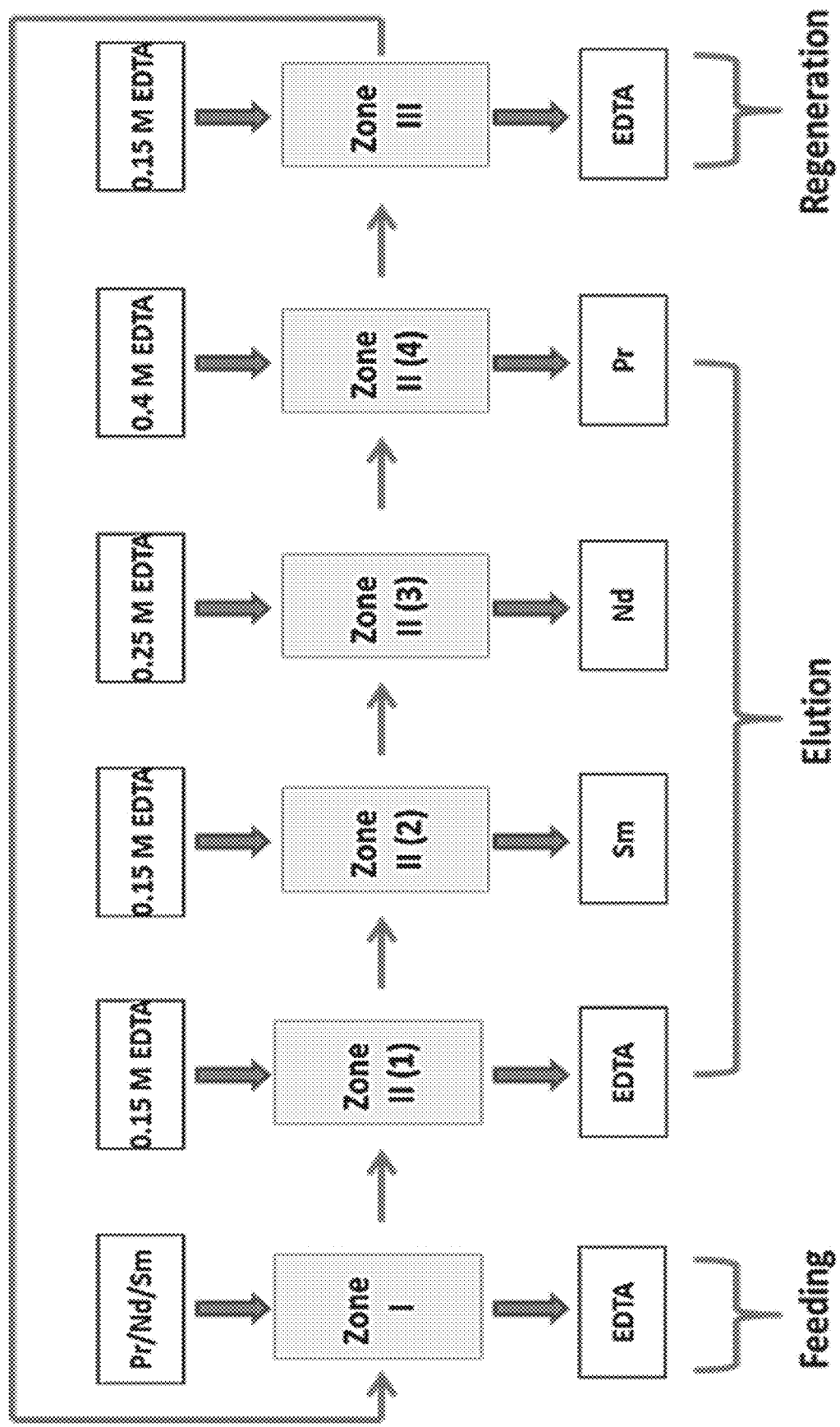
FIG. 11 describes continuous ligand-assisted elution sequence of Sm, Nd, and Pr.

Chromatography processes have two to three orders of magnitude higher interfacial area per volume (>500 m$^2$/cm$^3$) for mass transfer than liquid-liquid extraction (<1 m$^2$/cm$^3$). Our results show that the column volume in ligand-assisted chromatography is two orders of magnitude smaller than the total volume of mixer/settlers reported for the liquid-liquid extraction for REE purification. More than 97% of the EDTA can be precipitated in an acid and recycled, resulting in little impact on the environment. For large-scale production, the separation of REEs can be done in a continuous mode with stepwise elution to save ligand and to increase sorbent productivity (FIG. 11).

TABLE 3

Product purities and yields for linear gradient and step-wise elution using ligand-assisted elution chromatography

|  | Linear gradient | | Step-wise | |
| --- | --- | --- | --- | --- |
| Product | Purity (%) | Yield (%) | Purity (%) | Yield (%) |
| Sm | 99 | 97 | 99 | 98 |
| Nd | 95 | 96 | 96 | 95 |
| Pr | 97 | 96 | 95 | 98 |

Ligand-Assisted Displacement Purification of REEs

Although conventional ion exchange resins have no selectivity for most of the REEs, a complexing agent (or ligand) which has high selectivities for different REEs can be used as displacers to achieve separations. Spedding, Powell, and others have demonstrated the feasibility of this method in batch chromatography in their pioneering studies in the 1950's and 1960's (Spedding, F. H. et al., *J. Am. Chem. Soc.* 1950; 72, 2354-2361; Spedding, F. H. et al., *J. Am. Chem. Soc.* 1954; 76, 2550-2557). The reported process separated three lanthanides using ligand-assisted displacement chromatography. The lanthanides were recovered with relatively high purity (~99%) and with yield from 83% to 93%. However, each separation run took several months, resulting in a very low adsorbent productivity. More importantly, the complex mechanisms in this system were not well understood, and no detailed chromatography model or systematic design/optimization method or scaling rules have been reported. We recently developed an improved design method and our experimental results show that average yield of high purity (99%) products is more than 97%, and sorbent productivity is an order of magnitude higher than that of Spedding and Powell. (Table 4).

Figure 12A:
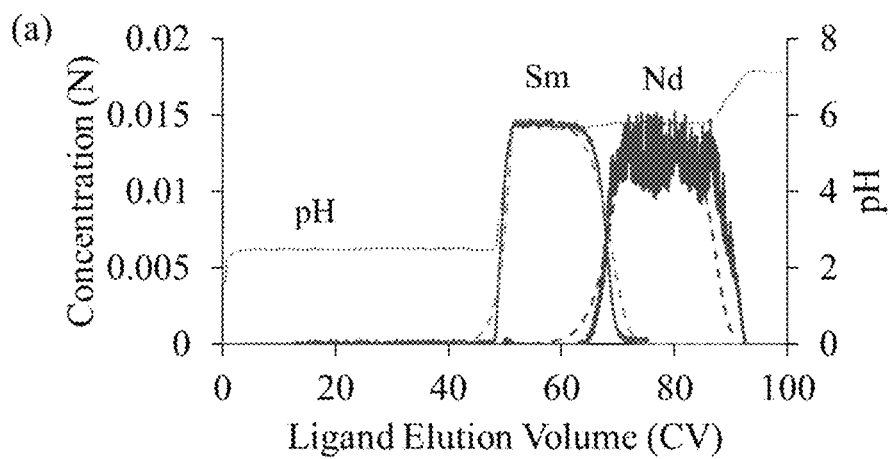
FIG. 12A describes ligand-assisted displacement separation of Sm and Nd using ammonium citrate elution. Resin: Dowex 50WX8; Feed: 6.7 mM Nd and 6.7 mM Sm in 150 mL of solution; Displacer 0.01M $NH_4$ citrate (pH 7); Column ID: 1.16 cm; column length 10 cm; superficial velocity: 2 cm/min.
Figure 12B:
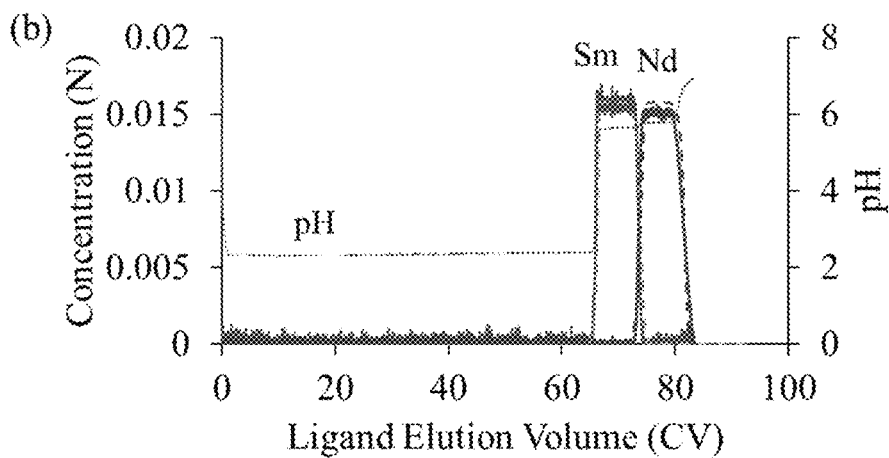
FIG. 12B describes ligand-assisted displacement separation of Sm and Nd using ammonium citrate elution. Resin: Dowex 50WX8; Feed: 6.7 mM Nd and 6.7 mM Sm in 300 mL of solution; Displacer 0.01M $NH_4$ citrate (pH 7); Column ID: 1.16 cm; column length 47 cm; superficial velocity: 2 cm/min.
Figure 12C:
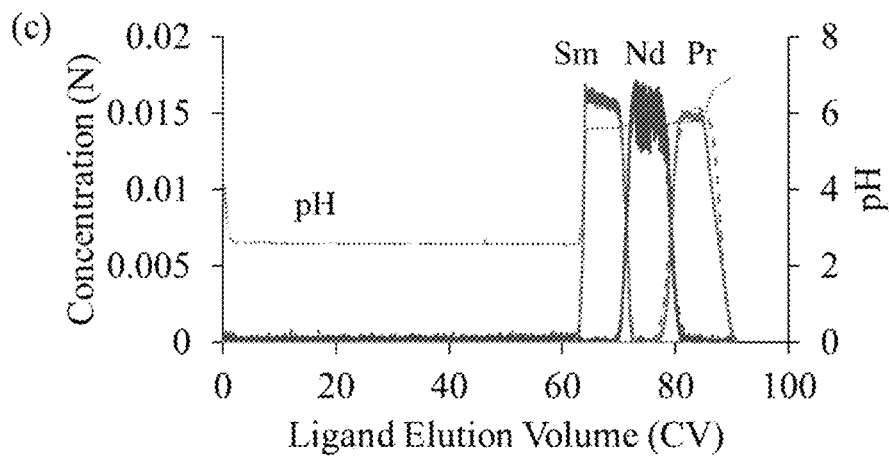
FIG. 12C describes ligand-assisted displacement separation of Sm, Nd, and Pr using ammonium citrate solution. Resin: Dowex 50WX8; Feed: 6.7 mM of Sm, Nd, and Pr in 300 mL of solution; Displacer 0.01M $NH_4$ citrate (pH 7); Column ID: 1.16 cm; column length 10 cm; superficial velocity: 2 cm/min.

Although the dynamics of ligand-assisted displacement at constant pattern appear to be similar to those of conventional displacement chromatography (without any reactions), the band migration mechanisms are entirely different. Rate model simulations (VERSE) were used to understand the dynamics of ligand-assisted displacement chromatography (Berninger, J. A. et al., *Comput. Chem. Eng.* 1991, 15, 749-768). The resin was pre-saturated with H$^+$ ions, and it has a high capacity, but no selectivity for Sm and Nd. The ligand (citrate in NH$_4^+$ form) has the highest affinity for the presaturant ion H$^+$, the second highest affinity for Sm, and the lowest affinity for Nd. The ligand has a selectivity of 1.8 for Sm over Nd.[4] During loading, both Sm and Nd adsorb strongly on the resin, resulting in an overlapped band without any separation. As the ligand enters the column, it competes with the resin for Sm and Nd to form stable complexes with the two components in the mobile phase, while allowing NH$_4^+$ to replace Sm and Nd in the resin. Since the ligand prefers Sm to Nd, complexed Sm migrates faster than complexed Nd, resulting in separations shown in FIGS. 12A and 12B. When a mixture of Sm, Nd, and Pr is fed into the column, each REEs is separated as pure bands based on the ligand affinity (FIG. 12C). Since the ligand prefers Sm to Nd and Nd to Pr, the Sm band is eluted first and the Pr band is eluted last.

TABLE 4

Comparison of Purdue Ligand-assisted displacement separation of Sm and Nd with those of Spedding et al. (Speeding F.H. et al., 1950).

|  | Spedding | This Study |
| --- | --- | --- |
| Sorbent | Amberlite IR 100 (30-40 mesh) | Dowex 50WX8 (200-400 mesh) |
| Complexing Agent | Citrate (0.005M, pH = 5.3) | Citrate (0.01M, pH = 7) |
| Yield for Pure Products (%) | 83-93 | 97 |
| Productivity (meq/L CV · h) | 0.65-0.39 | 28 |

Figure 13A:
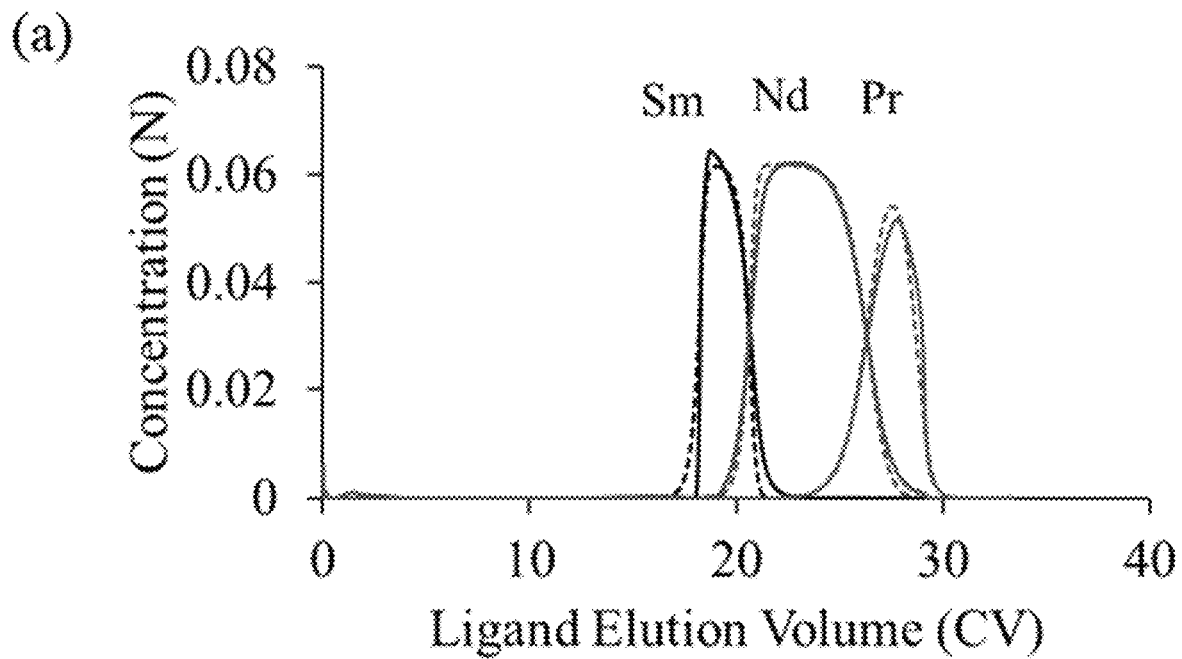
FIG. 13A describes ligand-assisted displacement separation of Sm, Nd, and Pr using EDTA solution. Resin: Dowex 50WX8; Feed: 0.054 M Sm, 0.125 M Nd, and 0.054 M Pr in 30 mL of solution; Displacer 0.03 M EDTA-Na (pH 8.4); Column ID: 1.16 cm; column length 30.5 cm; superficial velocity: 1.5 cm/min.
Figure 13B:
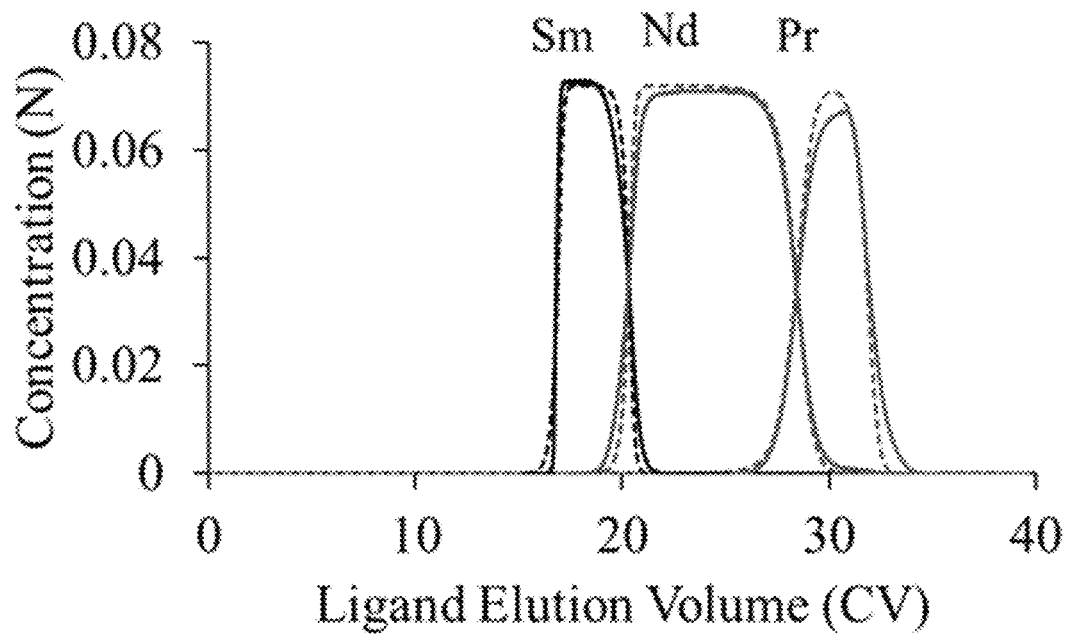
FIG. 13B describes ligand-assisted displacement separation of Sm, Nd, and Pr using EDTA solution with a different length of column. Resin: Dowex 50WX8; Feed: 0.054 M Sm, 0.125 M Nd, and 0.054 M Pr in 56 mL of solution; Displacer 0.03 M EDTA-Na (pH 8.4); Column ID: 1.16 cm; column length 36.4 cm; superficial velocity: 1.5 cm/min.

Instead of citrate, EDTA can also be used in ligand-assisted displacement chromatography for REE purification. EDTA has better selectivity for all REEs than citrate. FIGS. 13A and 13B show the separation of Sm, Nd, and Pr using ligand-assisted displacement with EDTA. The effective selectivity is the inverse of ligand selectivity. A large fraction (98%) of EDTA can be recycled by precipitation using an acid.

Equilibrium analysis results show that the concentrations of the fully developed bands of Sm and Nd are determined by the complexation reaction equilibrium constants, the adsorption equilibrium constants, the resin capacity, and the ligand concentration. The widths of the fully developed REE zones at constant pattern depend on the loading amounts, flow rate, and pH. Our results also shows that to achieve a high productivity, the ligand should have a high selectivity for REEs and the adsorbent and the ligand should have opposite selectivity sequences, so that they can work synergistically to develop separated pure REE bands in a short column.

Optimization of the REE purification process can be facilitated using detailed rate model simulations. VERSE simulation package developed previously at Purdue can be used for the design and simulation of multi-component batch and continuous ion exchange processes (Ernest, M V J, et al., *Ind. Eng. Chem. Res.*, 1997, 36, 212-226). The Standing Wave Design (SWD) method for linear or multi-component Langmuir isotherm systems will be extended to continuous ion exchange systems (Hritzko, B. J., et al., *AIChE J.* 2002, 48, 2769-2787). The SWD for Langmuir isotherm systems have been successfully used in developing a tandem Simulate Moving Bed (SMB) for insulin purification from a ternary mixture and a five-zone SMB to recover six sugars from biomass hydrolysates (with more than 10 components) (Xie, Y. et al., *Biotechnol. Prog.* 2002, 18, 1332-1344; Weeden, G. S., et al., *J. Chromatogr. A*, 2015, 1442, 99-116). High product purity (>99% insulin, >95% sugars, >99% flame retardants) and high yield (>99%) were obtained in all three processes. The SWD method can be extended to continuous multi-component ligand-assisted elution and displacement processes. A similar wave analysis can be used in developing the SWD for ligand-assisted chromatography. This method can be evaluated at a bench scale using SEMBA 100 continuous chromatography system for the recovery of high-purity REEs and to improve the individual steps to increase the yields and reduce costs for the overall process.

The following exemplary embodiments are included herein to further illustrate the invention. These exemplary embodiments are not intended and should not be interpreted to limit the scope of the invention in any way. It is to be understood that numerous variations of these exemplary embodiments are contemplated herein.

First Base Extraction

Class F fly ash 20 g is mixed with sodium hydroxide solution (5 M) 100 g in a round flask. The flask equipped with reflux condenser is put in an oil bath at 130-150° C. and stirred for 3 hours (2-6 hours) to dissolve silica. The mixture is cooled down to room temperature such that aluminum silicates generated during this digestion are precipitated as much as possible. The mixture liquid is separated from the solids by centrifugation or filtration. The leftover solids were washed with water and kept for next process. The liquid containing sodium silicates is kept and reused in next NaOH digestion process to increase the silica dissolution.

First Acid Dissolution

The leftover solids (20 g) were added into weak mineral acid such as 0.5 M hydrochloric acid 300 g. The mixture was sonicated or stirred for 20-40 min at room temperature and then liquid is separated from solids by centrifugation or filtration. The leftover solids were dissolve in acid again (0.1 M HCl 300 g) to increase the yield.

In acid dissolution process, aluminum silicates (mainly $Al_2O_3 \cdot 2SiO_2$) formed from the previous step can easily dissolve at room temperature. This will also assist the dissolution of REEs which was fused into silica matrix. Since the dissolution of aluminum silicates and iron oxide is limited by the pH-dependent solubilities, pH of acid solution is determined in the range between 2.5-3.0 to constrain iron dissolution, and selectively dissolve aluminum silicates and rare earth elements (REEs). Due to solubility constraints, acid dissolution is conducted twice to increase the aluminum silicates and REEs dissolution.

Second Base Extraction (May Use the First Base Extraction Solution)

Collected solids after acid dissolution steps were washed with water and then mixed again with the caustic extraction solution used in first step of caustic extraction. Caustic digestion is repeated to dissolve more silicates and form aluminum silicates salts. After cooled it down, the sodium silicates solution is separated by centrifugation or filtration. Silica gel can be produced by slowly adding acid to lower pH.

Second Acid Dissolution

The leftover solids from second base extraction is washed with water and then dissolve in weak acid (0.2 M HCl 300 g) to repeat dissolution processes. Depending on the ash compositions, acid concentration can be varied but pH needs to be about 3.0. After centrifugation or filtration, the residual solids are relatively high concentration of iron oxides with remained aluminum silicates.

Recovery of silica gel. The combined base extraction solution containing substantially pure sodium silicate is acidified with hydrochloric acid to pH 10 at an elevated temperature. Substantially pure silica gel is formed and recovered from the solution.

Recovery of Aluminum Silicate

Collected acid solution containing aluminum silicates and REEs is titrated by slowly adding 1 M NaOH until pH become higher than 5. Substantially pure aluminum silicates are quickly formed and precipitated from the solution which can be separated using centrifugation or filtration.

Gelation at an Elevated Temperature to Recover Silica Gel from the Acid Dissolution Solution (See FIG. 5D)

Collected acid solution containing aluminum silicates and REEs is put at an elevated temperature (60-80° C.) for 1-2 days to expedite silica gelation. The silica gel is collected by centrifugation and supernatant is collected to further treatment. More than 95% of silica can form a gel within 20 hours while about 60-90% aluminum ion and about 80% iron ion can remain in the gel supernatant. The concentration change of REEs is similar to that of aluminum such that 60-90% REEs remain in separated supernatant.

Capture REEs and Aluminum Ions Via Direct Aluminum Precipitation (A)

Recovered gel supernatant contains aluminum ions, REEs with other mono- or divalent cations. Our previous results showed that aluminum concentration is also much higher than that of REEs by two orders of magnitudes. High concentration of aluminum ions can be separated as aluminum hydroxide precipitates by adjusting pH 4 to 7. Substantially pure aluminum hydroxide precipitates can be collected by centrifugation or filtration. The precipitated aluminum hydroxide can be heated to form high-purity aluminum oxide. The leftover solution, REEs crude solution, can be loaded on the cation exchange column until the column is saturated. The pH of the eluted solution will decrease when the column is saturated because adsorbed hydrogen ions will be replaced with aluminum, REEs, and other metal ions. The eluted solution during loading the REEs crude solution is pure diluted acid solution so that it can be recycled to previous acid dissolution process. Since adsorbed multivalence cations can be desorbed and readily form a chelating complex with EDTA and traveling through mobile phase, captured cations can be eluted with ligand which is EDTA-REEs crude solution. Note that any ligand can be used in this procedure instead of EDTA such as IDA, DTPA, and NTA. When REEs crude solution is loaded on the strong cation exchange resins (e.g. DOWEX 50W X8) and eluted with high concentration of EDTA solution, REEs can be concentrated by orders of magnitudes in the eluted EDTA-REEs crude solution. In case B, Recovered gel supernatant contains a mixture of aluminum, REE, and other mono- or divalent cations. Our previous results showed that aluminum concentration is much higher than that of REEs by two orders of magnitude. This solution can be on to a sodium loaded cation exchange resin. The mono- or divalent cations will pass through the column and can be removed at this time. Since adsorbed multivalence cations can be desorbed and readily form a chelating complex with DTPA and traveling through mobile phase, captured cations can be eluted with ligand which is a DTPA-REE crude solution. Note that any ligand can be used instead of DTPA such as EDTA, IDA, and NTA given that it shows sufficient selectivity between Rare Earth and Aluminum. When the REE aluminum crude solution is loaded onto a strong cation exchange resin (e.g. DOWEX 50W X8) and eluted with DTPA solution the concentration of REE relative to the aluminum concentration can be increased by orders of magnitude. The DTPA can then be recycled by loading onto an hydrogen loaded cation exchange bed. The rare earth loaded onto the bed can be concentrated in elution sufficiently for ligand-assisted chromatography separation processes. This resulting solution have sufficient REEs concentration to use ligand-assisted chromatography separation process. Other metal ions such as Pb, Cd, Mg, Zn, Ba, and Sr, may be collected in different fractions by adjusting ligand elution conditions. Precipitation will be used to recover the other metal ions. EDTA can be precipitated at pH 1 and recycled. Overall, a large fraction of the acid solution can be recycled and reused to minimize acid waste after removal of REEs and other metal ions in the capture and enrichment process.

Capture REEs and Aluminum Ions Via Cation Exchange (B)

Recovered gel supernatant contains a mixture of aluminum, REE, and other mono- or divalent cations. Our previous results showed that aluminum concentration is much higher than that of REEs by two orders of magnitude. This solution can be on to a sodium loaded cation exchange resin. Since adsorbed multivalence cations can be desorbed and readily form a chelating complex with DTPA and traveling through mobile phase, captured cations can be eluted with ligand which is a DTPA-REE crude solution. Note that any ligand can be used instead of DTPA such as EDTA, IDA, and NTA given that it shows sufficient selectivity between Rare Earth and Aluminum. When the REE aluminum crude solution is loaded onto a strong cation exchange resin (e.g. DOWEX 50W X8) and eluted with DTPA solution the concentration of REE relative to the aluminum concentration can be increased by orders of magnitude. The mono- or divalent cations will also adsorb on the column, but they eluted by loading high concentration of sodium cations after eluting REEs and aluminum with ligands. The DTPA can then be recycled by loading onto a hydrogen loaded cation exchange bed. The rare earth loaded onto the bed can be concentrated in elution sufficiently for ligand-assisted chromatography separation processes. Precipitation will be used to recover the other metal ions. A large fraction of the acid and ligands solution can be recycled and reused to minimize acid waste after removal of REEs and other metal ions in the capture and enrichment process.

Ligand-Assisted Chromatography

In this process, eluted EDTA-metal complex form can be loaded on the column packed with $TiO_2$ sorbent or cation exchange resins and then eluted with pure EDTA solution. Since every metal ion have different affinity to EDTA, each EDTA-metal complex is purified because of different moving velocity in the column. Each collected fraction will be treated with acid solution. EDTA will be precipitated at pH below 1 whereas metal ions remain in the liquid. Precipitated EDTA can be recycled about 99%. Pure metal fractions can be precipitated again to form pure metal salts.

Zeolite Synthesis

Collected caustic solution containing sodium silicates, silica gel, and purified aluminum salts will be used to synthesize zeolite Y. The well-known hydrothermal method is applicable in this process. The amount of pure precursors will be determined based on a molar ratio of Na/Si/Al of a certain zeolite type. Produced zeolites are centrifuged or filtered and the leftover liquid is to recycled back in the process.

Electro Dialysis

The leftover liquid after zeolite synthesis can go through electro dialysis process such that NaOH solution is concentrated up to 20-40% which is commonly practiced as an industrial process. Separated caustic solution and pure water will be recycled in the whole process to make a diluted solution as needed for various purposes.

Specific Example I—An experiment was carried out in which 3 g of fly ash was placed in 10 g of 12 M NaOH. The mixture was placed in an autoclave and heated at 150° C. for 1 hour. 33% of $SiO_2$ and 4.3% of $Al_2O_3$ was extracted into the NaOH solution. The remaining solid was washed with water. The washed remaining solids (2 g) were then washed in 20 g of 1 M HCL. After this acid wash the extraction was raised to 64% for $SiO_2$ and 55% of $Al_2O_3$ after the acid was. Iron oxide ($Fe_2O_3$) was extracted in 6.1%. The results are summarized in Sample 3 Table 5.

TABLE 5

Summary of specific experiments performed

| Sample Name (Features) | Type of Ash | Source of Ash | Ash to Base Ratio | T (° C.) | Time | NaOH Conc. | Molar Ratio $SiO_2$:NaOH | HCl Conc. | Solid to Acid Wt. Ratio | $SiO_2$ extraction % | $Al_2O_3$ extraction % |
|---|---|---|---|---|---|---|---|---|---|---|---|
| 1) 1 to 5 Boiled | PC Fly Ash | NIST Ash | 1:5 | 100 | 1 h | 5M | 1:5.1 | 1M | 1:10 | 81 | 45 |
| 2) 1 to 5 Boiled | PC Fly Ash | Class F Ash* | 1:5 | 100 | 1 h | 5M | 1:5.1 | 1M | 1:10 | 66 | 58 |
| 3) Autoclave | PC Fly Ash | Class F Ash* | 1:3.3 | 150 | 1 h | 30 wt. % | 1:4.9 | 1M | 1:10 | 64 | 55 |
| 4) 1 to 5 Boil/recycled | PC Fly Ash | Class F Ash* | 1:5 | 100 | 3 h | 5M | 1:5.1 | 0.5M | 1:15 | 99** | 67** |

TABLE 5-continued

Summary of specific experiments performed

| Sample Name (Features) | Type of Ash | Source of Ash | Ash to Base Ratio | T (° C.) | Time | NaOH Conc. | Molar Ratio $SiO_2$:NaOH | HCl Conc. | Solid to Acid Wt. Ratio | $SiO_2$ extraction % | $Al_2O_3$ extraction % |
|---|---|---|---|---|---|---|---|---|---|---|---|
| 5) 1 to 5 Boil/recycled | PC Fly Ash | Class F Ash* | 1:5 | 100 | 3 h | 5M | 1:5.1 | 1.5M | 1:5 | 96 | 73 |
| US patent | Fe Enriched Ash | Fe Enriched Process | 1:3.3 | 200 | 1 h | 30 wt. % | 1:4.9 | 2M | 1:10 | 93-97 | 40-71 |

*Original composition of class F ash is slightly different from NIST ash: 40.2% $SiO_2$, 23.2% $Fe_2O_3$ and 19.2% $Al_2O_3$
**A process recycles NaOH solution and repeat the process to increase the yield Specific Example II—An experiment was carried out in which 20 g of ash was placed in 100 g of boiling 5 M NaOH solution. 34% of $SiO_2$ and 1.1% of $Al_2O_3$ was extracted in the NaOH solution. The remaining solid was washed with water. The residue (2 g) was washed in 20 g of 1 M HCl for 10 minutes at 60° C. under sonicating conditions. After the acid wash, the extraction is raised from 66% for $SiO_2$ and 58% for $Al_2O_3$. The extraction of $Fe_2O_3$ in the acid solution was 4.8%. These results are shown in sample 2 of Table 5.

Specific Example III—An experiment was carried out in which 10 g of ash was placed in 50 g of boiling 5 M NaOH solution. 40% of $SiO_2$ and 0.7% $Al_2O_3$ was extracted in the NaOH solution. The remaining solution was washed with water. The residue was washed in 50 g of 1.5 M HCl for 20 minutes under sonicating conditions at room temperature. After the acid wash the second acid wash was repeated using 1 M HCl 50 g. After the acid wash, the extraction is raised from 96% for $SiO_2$ and 73% for $Al_2O_3$. The extraction of $Fe_2O_3$ in the acid solution was 10%. These results are shown in sample 5 of Table 5.

Specific Example IV—An experiment was carried out in which 1 g of ash was placed in 5 g of 5 M NaOH solution and then boiled for 3 hours. The remaining solid was washed with water and followed by dissolving in 1 M HCl in a ratio of 10:1 acid to solid by mass under sonicated conditions for 40 minutes. The remaining solid was repeated to washing in 1 M HCl in at 10:1 acid to solid ratio by mass under sonicated conditions for 1 hour and then it was let sit at room temperature for 11 hours. The dissolution results are shown in Table 6. Data from several experimental studies are summarized in sample 1 of Table 5.

TABLE 6

Dissolution effectiveness of each step in Example IV.

| | $SiO_2$ | $Al_2O_3$ | $Fe_2O_3$ | REEs | Conditions |
|---|---|---|---|---|---|
| NaOH dissolution | 48% | 0.9% | 0.5% | <1% | 5M, 1 to 5, boiled 3 hours |
| $1^{st}$ Acid wash | 29% | 38% | 2.4% | 40% | 1M, 1 to 15, sonicated 40 min |
| $2^{nd}$ Acid wash | 3.6% | 6% | 14.6% | 20% | 1M, 1 to 15, sonicated 1 hour + 11 hour |
| Total dissolution | 80.6% | 45% | 17.5% | | |

Specific Example V—An experiment was carried out in which 2 g of ash was placed in 10 g of 5 M NaOH solution and then boiled in an oil bath (130° C.) for 3 hours. The remaining solid was washed with water and then dried. The dried solid was mixed with 0.5 M HCl in a ratio of 15:1 acid to solid by mass. The mixture was sonicated for 40 minutes at 20° C. The remaining solid was separated and then placed in 0.07 M HCl in at 15:1 acid to solid ratio by mass. This mixture was sonicated for 40 minutes at 20° C. The residual solid was separated and then washed with water. The NaOH process was repeated by recycling the basic solution to increase the yield of sodium silicate. The remaining solid was washed with water and then mixed with 0.2 M HCl solution in a 15:1 acid to solid ratio by mass. The dissolution results are shown in Table 5. To produce silica gel from sodium silicates, pH of the solution is adjusted to pH 1-3 by adding acid (1 M HCl). The gelation reaction is assisted at 60° C. for 3 hours. The resulting silica gel is centrifuged and then washed with water. Aluminum silicate salts can be produced when the leftover acid solution from step 2 and 4 in Table 7 is titrated with basic solution such as NaOH or KOH. Base is added to the leftover acid solution to adjust pH higher than pH 5 and let it sit for 3 hours. This leads to form aluminum silicates salts quickly. The aluminum silicates can be filtered or centrifuged, washed with water, and dried.

Specific Example VI—Gelation of Silica from the Leftover Acid Solution

The acid solution containing aluminum silicates and REEs, collected from acid dissolution process step 2 (0.5 M HCl) in example V, is put in an oven (60-80° C.) for 1~2 days to assist forming silica gel. The silica gel is collected by centrifugation and supernatant is collected to further treatment. More than 90% of silica can form a gel within 20 hours while about 90% aluminum ion remain in the gel supernatant as shown in Table 8 and FIG. 6A. Compared to Si or Al is 2000~3000 ppm, Fe concentration is about 30 ppm in acid solutions and then decreased slightly during a gelation. Thus, about 80% iron can remain in the gel supernatant too. Most of REEs will be remained in an acid solution according to ICP-MS analysis (FIG. 6B).

TABLE 7

Stepwise dissolution effectiveness in Example V.

| | $SiO_2$ (%) | $Al_2O_3$ (%) | $Fe_2O_3$ (%) | REEs (%) | pH | Volume ratio (Temperature) |
|---|---|---|---|---|---|---|
| 1) NaOH Dissolution (5M) | 38 | 0.7 | 0.05 | <0.5 | High | 5 g/1 g Ash, Boiled at 130° C. for 3 hours |
| 2) Acid Dissolution (2 times: 0.5M & 0.07M HCl) | 24 | 46 | 1 | 83 | 2.8~3.1 | 15 g/1 g Solids from NaOH (1), Sonicated 40 min |
| 3) $2^{nd}$ NaOH (Recycle) | 25 | 0.6 | 0.15 | <0.5 | High | 5 g/1 g Solids from NaOH (1), Boiled at 130° C. for 3 hours |
| 4) $2^{nd}$ Acid Dissolution (0.2M HCl) | 12 | 20 | 1.2 | 7 | 2.8 | 15 g/1 g Solids front NaOH (1), Sonicated 40 min |
| Total Dissolution (%) | 99 | 67.3 | 2.4 | 90 | | |
| Errors | <4% | <10% | <2% | <4% | | |

TABLE 8

Concentration change in solution during gelation at 80° C.

| | 0 hours | 20 hours | 45 hours |
|---|---|---|---|
| $Si/Si_0$ | 100% | 11.4% | 6.1% |
| $Al/Al_0$ | 100% | 91.0% | 92.5% |
| $Fe/Fe_0$ | 100% | 68.8% | 81.3% |
| $REE/REE_0$ | 100% | N/A | 81.5~99% |

Specific Example VII—Aluminum Precipitation (Case A)

An experiment was carried out in which 1 M NaOH solution was added into 10 mL of the leftover acid solution, which was separated from an example V and contains REEs, until pH 4 or 6. The mixture was kept for 12 hours and centrifuged to separate aluminum hydroxide and the leftover solution containing REEs. Based on the ICP-MS analysis, almost all of the Al (>99%) was recovered as $Al(OH)_3$ and 25 to 74% of REEs were recovered in the leftover solution as shown in FIG. 7.

Specific Example VIII—Capture of Al and REE and Elution Using DTPA (Case B)

An experiment was carried out in which 20 mL of a synthetic mixture of 0.3 N Al and 0.002 N Dy were loaded onto an 18.5 cm long (i.d. 1 cm) column packed with a sodium loaded DOWEX 50W X8 (200-400 mesh) at 2 mL/min. After loaded, the columns were flushed with 10 mL of distilled deionized water at 2 mL/min. The column was then eluted using a 0.001 M solution of DTPA at pH 7. Fractions from the column were taken and the concentrations of both Al and Dy were measuring using flame atomic adsorption. The resulting profiles are shown in FIG. 8. As shown in FIG. 8, when 97% of the Dy is recovered, the molar ratio between Al and Dy can be reduced from 130 to 3.

Specific Example IX—A Sequential Separation Process

Overview of the sequential separation process to recover Si, Al, Fe, and rare earth elements (REEs)

Figure 14:
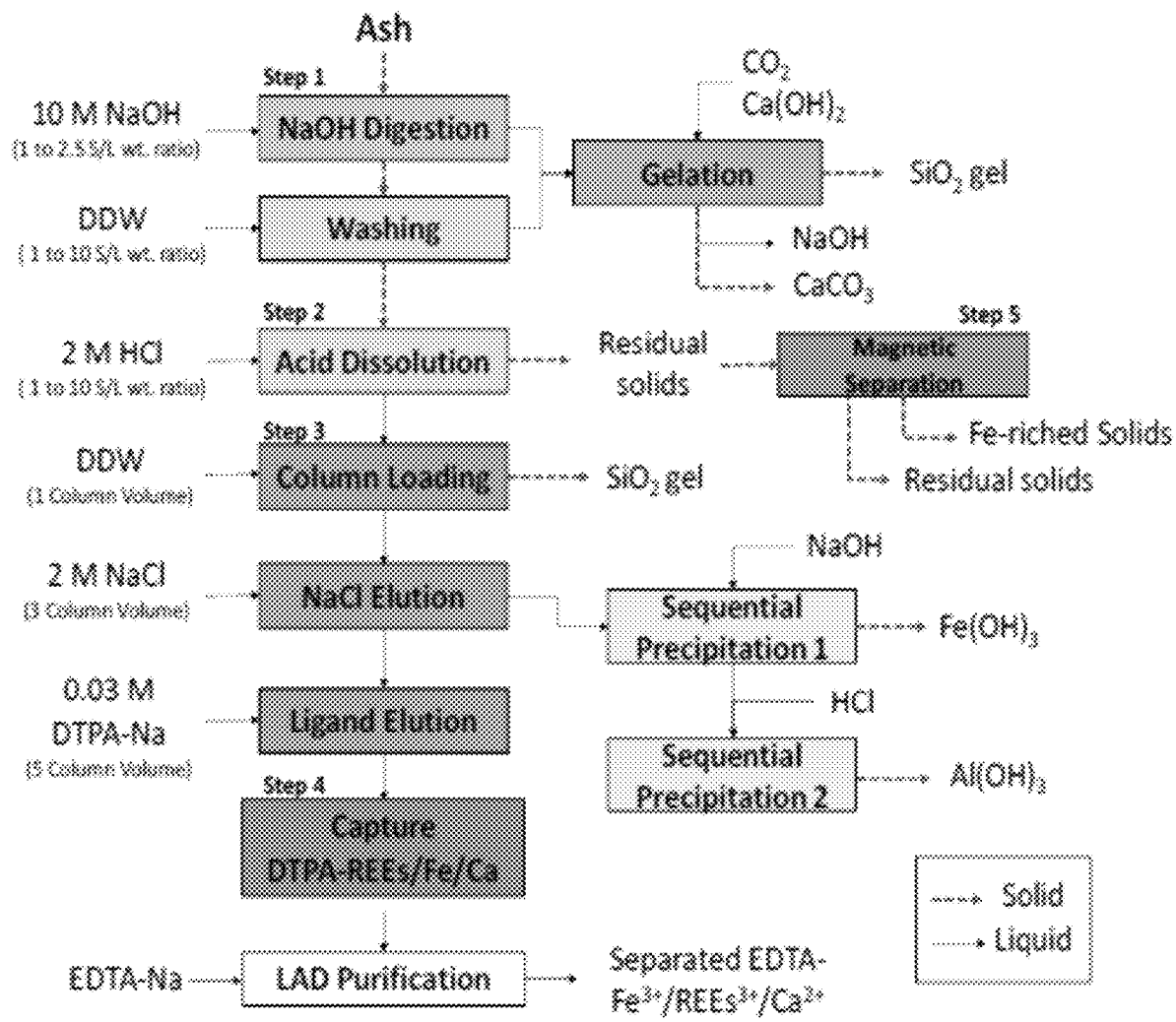
FIG. 14 shows a schematic flowchart of the sequential separation process.

A simplified process was also investigated and it was found that a comparable efficiency of separation and isolation was achieved. An overview of the process flowchart is shown in FIG. 14. First, coal fly ash is digested with 10 M NaOH solution (Step 1). The solids were separated from the NaOH solution, washed with DDW, and sent to the acid dissolution step. The NaOH and DDW solutions contained sodium silicates. Both solutions were mixed and sent to the gelation step to produce a silica gel and to recover NaOH.

In the acid dissolution step, major components of ash and REEs were dissolved using 2 M HCl in Step 2.

The acid solution containing Si, Al, Fe, Ca, and REEs was sent to a capture process, where the acid solution was loaded on a Na-saturated ion exchange bed (Step 3). Since the Si species were negatively charged, they do not adsorb on the cation exchanger bed and eluted as a high purity fraction. Then, the captured Al and Fe cations were eluted using a 2 M NaCl solution. Most (88%) of Fe and almost all Al in the acid solution were eluted in the same effluent fraction, which was sent to a sequential precipitation step to produce high purity Fe(OH)3 and Al(OH)3.

The REEs captured in the cation exchanger bed and the rest of the Fe and some Ca were then eluted using a ligand solution 0.03 M DTPA. In the ligand elution step, Fe, REEs, Ca were eluted as DTPA-cation complex species. DTPA-Fe and DTPA-REEs fractions were sent to another REE concentration column to redeposit and accumulate REEs and Fe in the column (Step 4). The accumulated REEs were eluted as EDTA-REEs, which was the feedstock for the LAD purification step (Chapter 3 and 4). The residual solids were washed with water and magnetic separation was used to collect a Fe-enriched solid (Step 5).

Sequential Separation Process Step 1—NaOH Digestion of Coal Fly Ash (See FIG. 14)

The class F coal fly ash (20 g) was mixed with 10 M sodium hydroxide solution with a solid to liquid (S/L) mass ratio of 1 to 2.5 in a round-bottom flask. The flask was boiled in an oil bath at 120° C. with stirring and refluxing. After 4 hours of reaction, the flask was removed from the oil bath and cooled down to room temperature. The leachate, called sodium silicate solution, was collected via filtration and the solids were washed with DDW (200 g) to remove the NaOH solution remaining in the pore phase. Separated solids were collected and dried in an oven at 80° C. The crystalline structure and elemental analysis of the solids after NaOH were conducted using XRD and SEM-EDS. The concentration of major components in the sodium silicate solution was measured using AAS. For a kinetic test, during the base digestion reaction, aliquots (0.5 mL) of the mixtures were taken periodically. The aliquots were filtered using syringe filters and then diluted to measure Si and Al concentration in the aliquots using AAS.

Since REEs are mostly in the aluminosilicate glassy phase, the REEs dissolution rate is limited by acid diffusion in the glassy phase (J. F. King, et al., *Int. A. Coal Geol.* 2018, 195, 75-83). Therefore, it is more efficient to eliminate the glassy matrix prior to the acid dissolution process.

In the NaOH digestion, amorphous silica and aluminosilicates dissolve into base solution and then quickly forms zeolite structures on the surface of ash particles (J. Ding, et al., *Hydrometallurgy*, 2016, 161, 58-64). The dissolved aluminum was converted to zeolite structures. Excessive silica species dissolves as sodium silicate in NaOH solution. The mechanisms of aluminosilicate dissolution and zeolite formation are shown below.

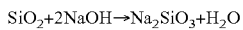

$SiO_2 + 2NaOH \rightarrow Na_2SiO_3 + H_2O$

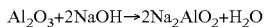

$Al_2O_3 + 2NaOH \rightarrow 2Na_2AlO_2 + H_2O$

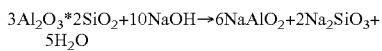

$3Al_2O_3 \cdot 2SiO_2 + 10NaOH \rightarrow 6NaAlO_2 + 2Na_2SiO_3 + 5H_2O$

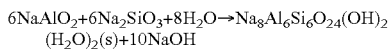

$6NaAlO_2 + 6Na_2SiO_3 + 8H_2O \rightarrow Na_8Al_6Si_6O_{24}(OH)_2(H_2O)_2(s) + 10NaOH$ In the NaOH digestion step, REEs and iron oxides were left in the solid phase due to low solubility. Therefore, the solids separated from the NaOH solution were washed with DDW to remove excessive NaOH left in the pore phase and then sent to the acid dissolution step (Step 2) to extract the REEs. The separated NaOH solution containing sodium silicates was sent to the gelation step to produce silica gel and regenerate the NaOH solution.

Step 2—Add Dissolution to Extract REEs (See FIG. 14)

The filtered solids (19.6 g) from the NaOH digestion step was mixed with 2 M HCl solution (196 g) with a solid to liquid (S/L) mass ratio of 1 to 10. The mixtures were sonicated for 30 minutes and then separated by centrifugation (6000 rpm, 10 min). The separated solution was collected, and the concentration of Fe, Si, Ca, and Al concentration was analyzed using AAS.

The overall dissolution processes are explained below. Iron oxide, calcium oxide, and sodium aluminosilicates react with the hydrochloric acid. When the aluminosilicates are removed, the glassy matrix of ash particles is significantly reduced so that REEs can be easily extracted from the acid solution.

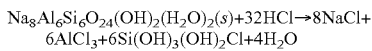

$Na_8Al_6Si_6O_{24}(OH)_2(H_2O)_2(s) + 32HCl \rightarrow 8NaCl + 6AlCl_3 + 6Si(OH)_3(OH)_2Cl + 4H_2O$

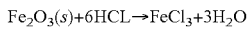

$Fe_2O_3(s) + 6HCL \rightarrow FeCl_3 + 3H_2O$

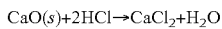

$CaO(s) + 2HCl \rightarrow CaCl_2 + H_2O$

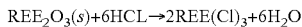

$REE_2O_3(s) + 6HCL \rightarrow 2REE(Cl)_3 + 6H_2O$

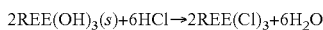

$2REE(OH)_3(s) + 6HCl \rightarrow 2REE(Cl)_3 + 6H_2O$

The solid to liquid mass ratio was fixed at 1 to 10 during this acidic extraction. The acid concentration was determined as the equivalent amount of acid to dissolve all aluminum silicates and iron oxides. Because the dissolution of aluminum silicates accelerates the extraction of major components, the concentration of the extracted components in acid solutions reached a plateau within 30 minutes at room temperature.

Figure 15:
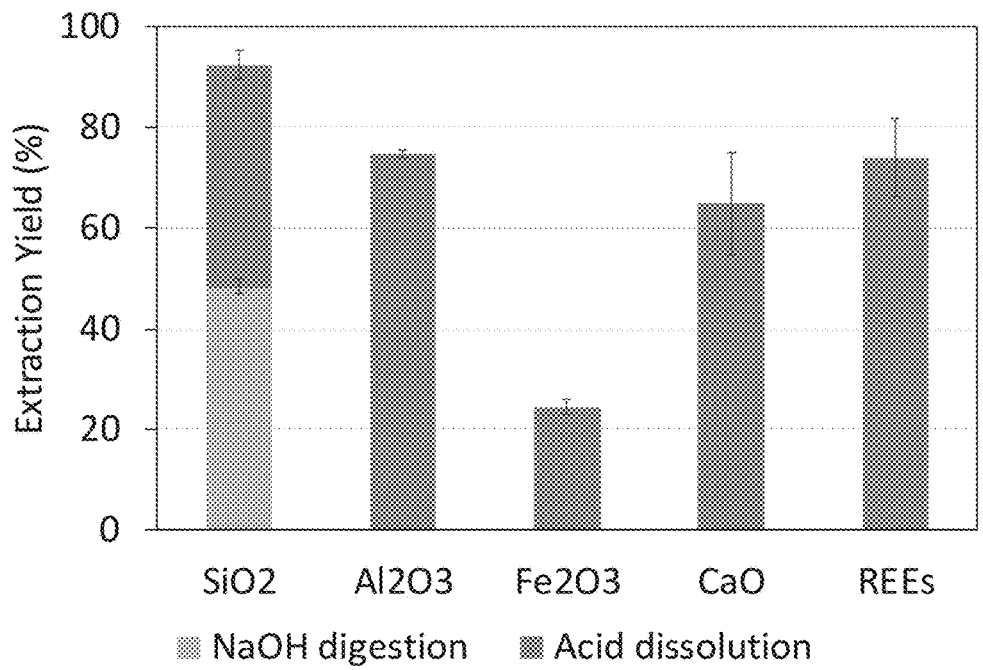
FIG. 15 depicts extraction efficiency of $SiO_2$, $Al_2O_3$, $Fe_2O_3$, Cao, and REEs in NaOH digestion and acid dissolution steps.
Figure 16:
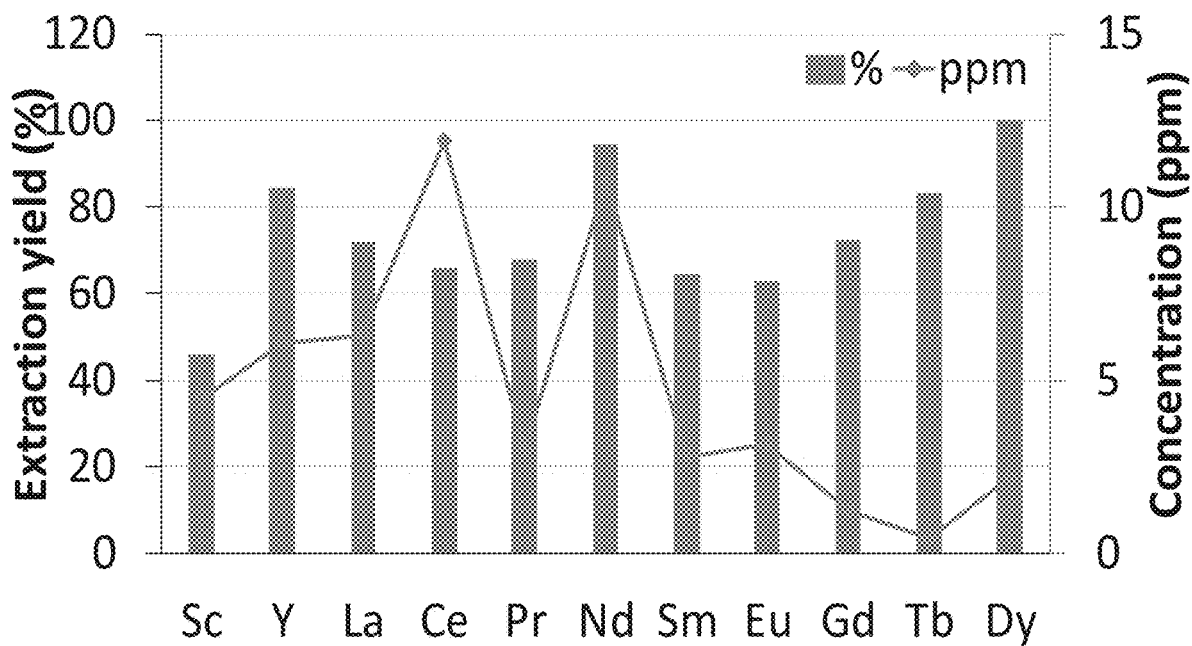
FIG. 16 shows REE extraction efficiency and their concentrations in the acid solution from the acid dissolution step.

The extraction yields of major components ($SiO_2$, $Fe_2O_3$, $Al_2O_3$, and CaO) and REEs in acid solution were shown in FIG. 15. The extraction yield for individual REE was shown in FIG. 16. In acid dissolution step, 44% of $SiO_2$, 74% of $Al_2O_3$, and 24% of $Fe_2O_3$, and on average 74% of REEs were extracted in the HCl solution. The extraction efficiencies of REEs were close to that of Al, indicating that most of REEs were in aluminum phase. The results were consistent with the data from previous literature (R. Lin, et al., *Fuel*. 2017, 200, 506-520).

At this step, although the REEs extraction efficiency showed high yields, the solution also contains significant amounts of Si, Al, and Fe species. The concentration of REEs were orders of magnitudes lower than that of major components. Therefore, it is important to collect REEs without loss and to reduce the concentration of other components in further purification processes.

Figure 17:
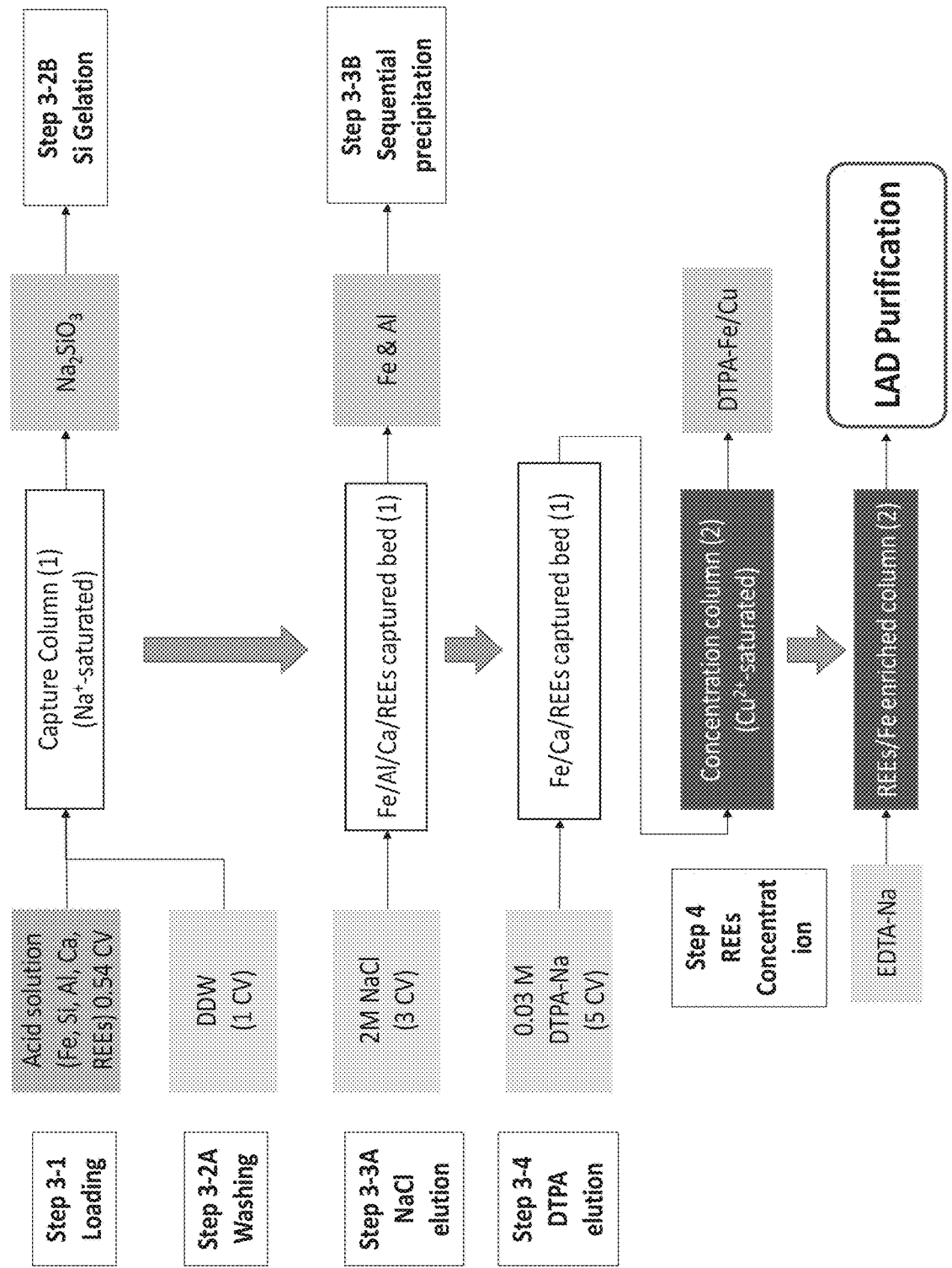
FIG. 17 is an overview of cation exchange step (Step 3) and REE concentration step (Step 4) to recover REEs and other components from an acid solution containing Fe, Si, Al, Ca, and REEs.

Step 3—Cation Exchange Steps to Capture REEs (See FIGS. 14 and 17)

A column was packed with AG-MP50 resins using a slurry packing method of the art. The packed column volume was 93 mL (i.d.1.16 cm by Lc 88 cm). Before loading the acid solution, the column was saturated with Na+ ions by eluting with 1 M NaCl and washing with DDW for 2 column volume (CV).

To capture cations in the leaching solution, the acid leaching solution was loaded on the column. Erbium ions (Er3+) were spiked (600 mg/kg) in the solution in order to track the REEs. A 50 mL of the leaching solution was loaded onto the column with superficial velocity 2 cm/min and then the column was washed with 1 column volume of DDW at the same velocity. The eluate was collected every 3 minutes to measure the concentration of major components (Si, Al, Ca, Er, and Fe) using AAS. The eluted solution was kept at 80° C. overnight to form a silica gel.

The captured cations in the column were first eluted with 1 CV of 2 M NaCl solution at 5 cm/min of superficial velocity. Then, the column was further washed using 0.03 M DTPA-Na (pH 8.2) solution at 2 cm/min of superficial velocity. The eluate fractions were collected periodically to analyze the concentration of the Si, Al, Ca, Fe, and Er using AAS. The concentrations of REEs in the first four fractions and other fractions were measured using ICP-MS.

To recover the extracted REEs with high yields and to separate from major components, the cation exchange processes were conducted as shown in FIG. 17. There were several steps in the capture processes: loading, washing, and elution steps. In Step 3-1, the acid solutions were directly loaded on the column packed with a strong cation exchange column. In Step 3-2A, the column was washed with water to elute the nonadsorbing silica species. The collected effluent solution was heated up to form silica gel in Step 3-2B. In Step 3-3, the captured cations were eluted by 2 M NaCl and followed by 0.03 M DTPA solutions in Step 4. The eluted NaCl solution containing Al and Fe was sent to the sequential precipitation processes to produce Al(OH)3 and Fe(OH)3 at different pH (Step 3-3B). The eluted DTPA-REEs fractions were sent to another REEs capture column, which is saturated with $Cu^{2+}$, to accumulate REEs in Step 4. The accumulated REEs were eluted by forming EDTA-REEs complex species so that the concentrated REEs can be further purified into individual REEs using ligand-assisted displacement chromatography (LAD) process.

To scale up the processes, the operating conditions can be designed based on the dimensionless groups (L. Ling, et al., Analysis of Dynamic Phenomena in Liquid Chromatographic Systems with Reactions in the Mobile Phase, in: G. Eli, G. Nelu (Eds.), *Adv. Chromatogr.*, 52$^{nd}$ ed., CRC Press, 2014; pp. 169-246). For instance, loading volume is calculated based on the loading fraction (Lf), which is the ratio of the equivalent of total components to the total column capacity. The flowrate is calculated based on the dimensionless group ND, which is the ratio of intra-particle diffusion rate to the convection rate.

To ensure REEs capture and to leave a sufficient column length for the elution steps, the loading volume was determined to have the total loaded cations take less than 60% of total capacity in the column. The concentrations of $H^+$, $Al^{3+}$, $Fe^{3+}$, $Ca^{2+}$, and Si in the acid solution were 1 M, 0.28 M, 0.05 M, 0.06 M, and 0.31 M, respectively. Additionally, $Er^{3+}$ (3.6 mM) was spiked in the acid solution to trace REEs using AAS. Based on the column capacity of REEs and $Fe^{3+}$ (2 equivalent/liter), about half of the column volume of the acid solution was loaded and thus, the total cation concentrations took up 57% of the total column capacity.

Figure 18:
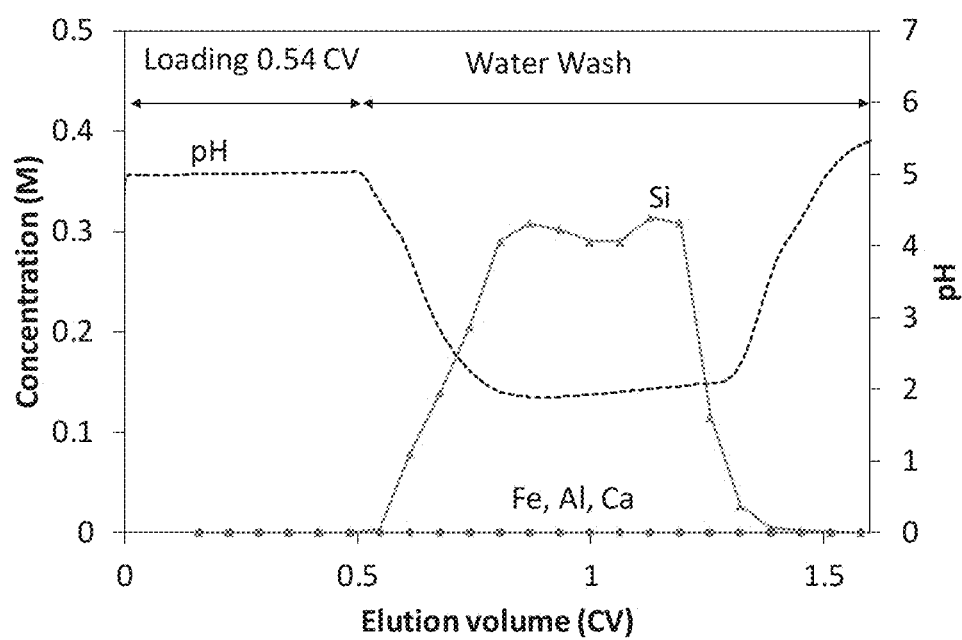
FIG. 18 shows effluent histories during acid loading and water washing steps (Steps 3-1 and 3-2A).

The effluent histories of acid loading and water washing steps, Step 3-1 and 3-2A (See FIG. 17), were shown in FIG. 18. Since the column was preloaded with $Na^+$ ions, the trivalent cations, $REEs^{3+}$, $Fe^{3+}$, and $Al^{3+}$, were easily captured in the column. Since the silica species is in the form of silicic acid ($Si(OH)_4$) which is non-adsorbing, the Si species can be eluted by flushing with water (E. A. Gorrepati, et al., *Langmuir.* 2010, 26, 10467-10474). According to the AAS results, the concentrations of $Al^{3+}$ and $Fe^{3+}$ were less than 1.5 ppm and neither $Ca^{2+}$ nor $Er^{3+}$ were detected. The ICP-MS results further confirmed that no $REEs^{3+}$ were in the effluents. These results demonstrated that the silica species were effectively separated from other cations.

Figure 19A:
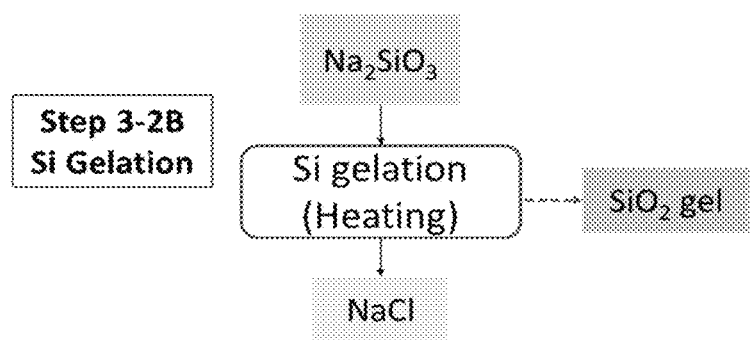
FIG. 19A shows a scheme of Step 3-2B.
Figure 19B:
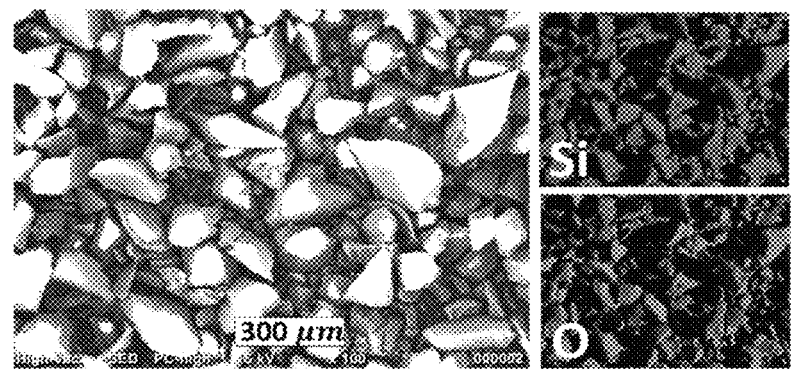
FIG. 19B shows SEM-EDS images.
Figure 19C:
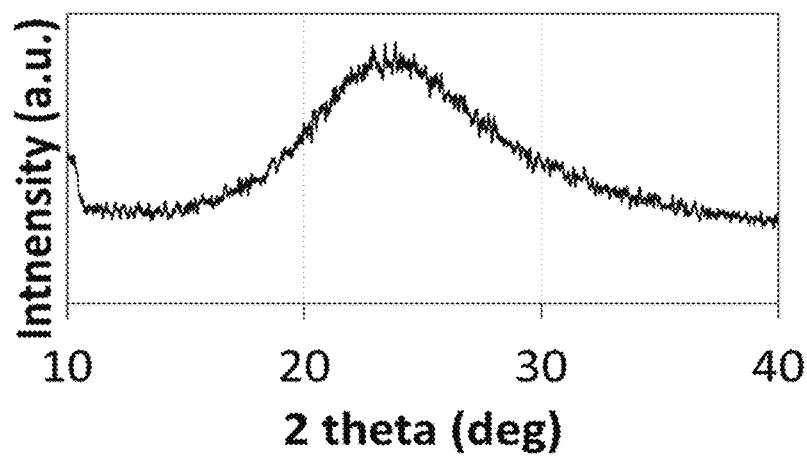
FIG. 19C depicts XRD data of the silica gel produced from an acid effluent in Step 3-2B.

Since the Si concentration was orders of magnitudes higher than other elements, it can form a high purity silica gel. In Step 3-2B, by increasing the temperature, the silica species spontaneously formed gel structures as shown in FIG. 19A. The purity was higher than 99.9% based on the total cation concentrations. The SEM-EDS scan also showed only Si and O components, demonstrating the high purity (>99%) silica gel (FIG. 19B). The XRD data (FIG. 19C) of the silica gel showed a smooth peak between 20 and 30 degree, which is the distinctive peak of the amorphous silica gel (U. Zulfiqar, et al., *J. Asian Ceram. Soc.* 2016, doi: 10.1016j.jascer.2015.12.001).

Figure 20:
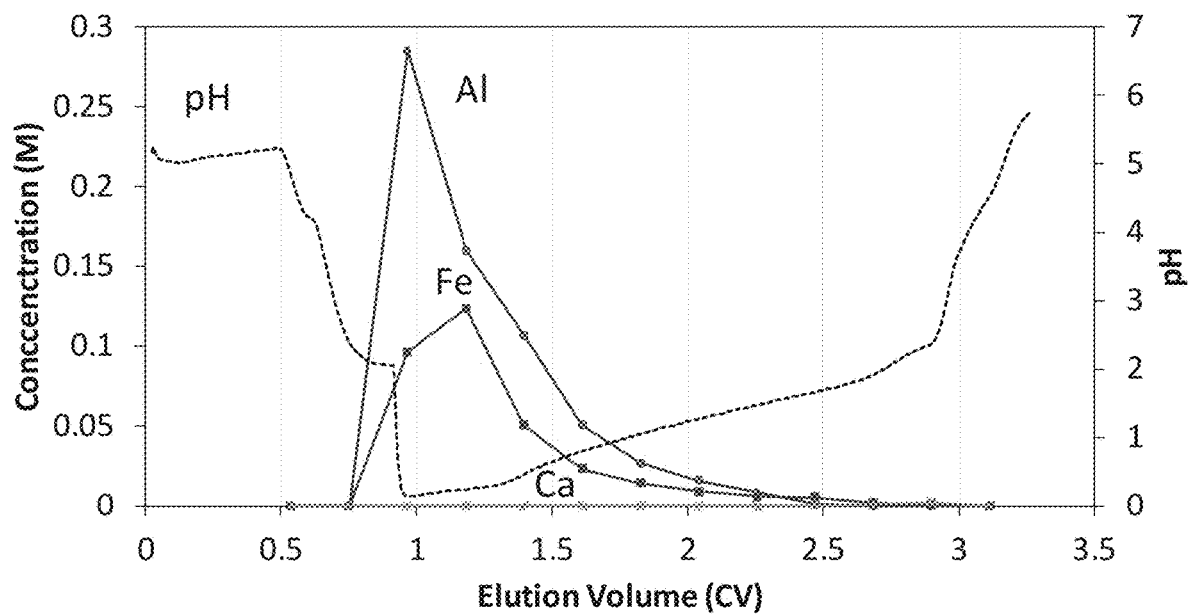
FIG. 20 shows effluent histories during 2M NaCl elution (Step 3-3A).

In Step 3-3A (See FIGS. 14 and 17), the captured $H^+$, $Al^{3+}$, and $Fe^{3+}$ ions were eluted by loading 2 M NaCl. Because of high concentrations of NaCl, the isotherms can be favorable to Na+ ions to displace divalent or trivalent cations according to the mass action law (M. V. J. Ernest, et al., *Ind. Eng. Chem. Res.* 1997, 36, 212-226). As a result, cations, which have lower sorbent affinity, elutes faster than other cations. In FIG. 20, the pH curve shows that H+ ions elute first and then $Al^{3+}$ and $Fe^{3+}$ were eluted out. It was noted that the sorbent affinity of $Ca^{2+}$ was higher than that of $Al^{3+}$ or $Fe^{3+}$ when the total cation concentrations were higher than 1 N. As a result, $Ca^{2+}$ ions were less readily displaced by Na ions compared to $Fe^{3+}$ and $Al^{3+}$ ions. According to the AAS, >99% of the captured $Al^{3+}$ and 88% of the captured $Fe^{3+}$ were eluted by loading 3 column volumes of NaCl solution. Only 2% of the captured $Ca^{2+}$ were detected at the end of the fractions. Since $REEs^{3+}$ have much higher sorbent affinity than that of $Ca^{2+}$, it was expected that the $REEs^{3+}$ remained in the column (F. W. E. Strelow, et al., *Anal. Chem.* 1965, 37, 106-111). As expected, AAS data showed that there was no $Er^{3+}$ detection in all fractions. The ICP-MS data showed blank intensity for REEs, meaning that REEs were still captured in the column. The collected effluents containing Fe and Al were titrated with NaOH to precipitate Fe and Al in Step 3-3B.

In Step 3-4 (See FIGS. 14 and 17), the $REEs^{3+}$, $Ca^{2+}$, and the $Fe^{3+}$ leftover in the column were effectively eluted using 0.03 M DTPA-Na solution via the ligand-assisted chromatography method. One can use either EDTA or DTPA for ligand elution but DTPA was chosen in this step because of its high solubility at low pH conditions. Since DTPA and cations can form complex species, they can migrate the column without adsorption when the solid phase is saturated with $Na^+$ ions.

Figure 21:
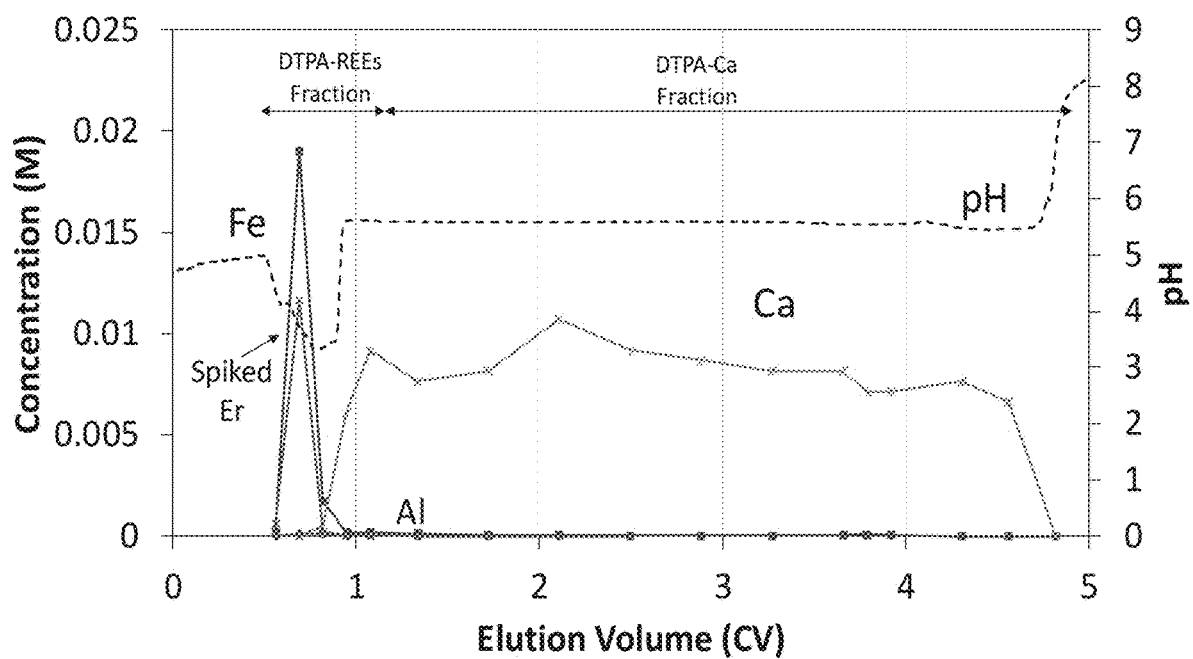
FIG. 21 shows effluent histories during DTPA elution (Step 3-4)
Figure 22A:
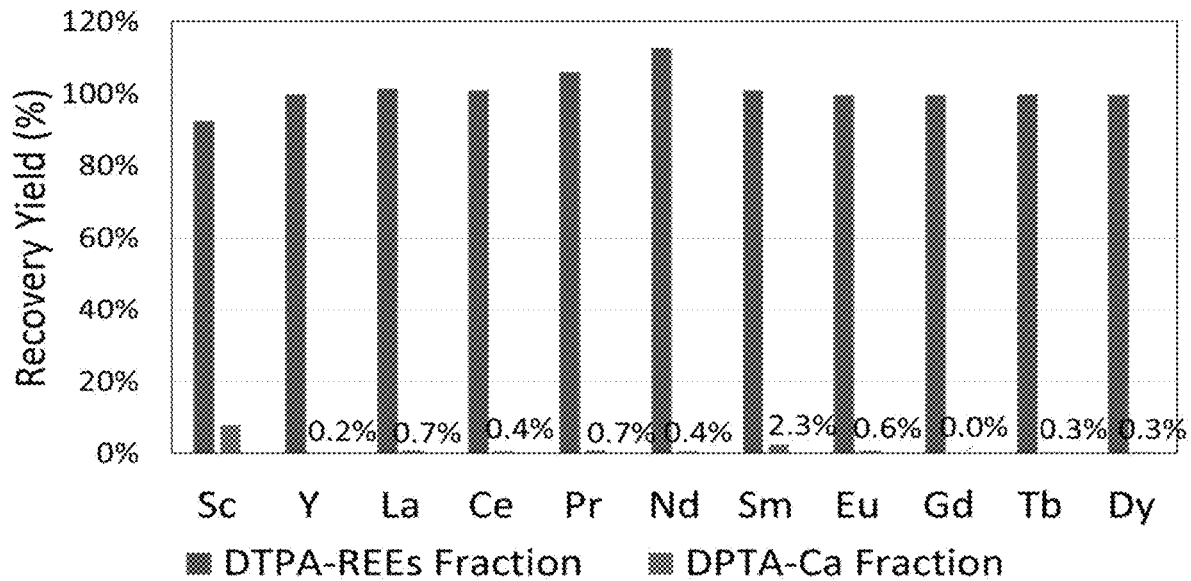
FIG. 22A shows recovery of REEs in DTPA-REEs fraction and DTPA-Ca fraction collected in Step 3-4.

Since DTPA prefers $Fe^{3+}$ to REEs to $Ca^{2+}$, the elution order follows the ligand affinity from Fe to Ca, as shown in FIG. 21. According to the AAS data, the spiked $Er^{3+}$ peak indicated that DTPA-REEs were eluted together with DTPA-Fe and thus it was separated from most of DTPA-Ca. Based on the AAS data, the first four fractions, which have a high concentration of Fe and Er, were combined as DTPA-REEs fraction (48 mL) and the rest of the fractions were combined as a DTPA-Ca fraction. In order to confirm the recovery of REEs, DTPA-Fe and DPTA-Ca fraction were analyzed using ICP-MS. The results are shown in FIG. 22A. Most of the REEs were coeluted with Fe so 92~99% of REEs were collected in the DTPA-REEs fractions. The overall mass balances between feed and the effluents were close to 100% for most REEs. However, Nd and Pr had relatively large errors. This was probably caused by the inhomogeneity of samples that may have affected experimental errors during the dilution of the samples.

When the total REEs concentration (41 ppm) was compared with the concentrations of Fe, Al, and Ca, the normalized total REEs concentration was increased by 226 times in the DTPA-REEs fractions. Since Al and Si were separated from previous steps, Fe and Ca were the main contributions of the total concentrations. The extracted REEs were 7% of the total cation concentrations in DTPA-REEs fractions because the extracted REEs in acid solution were successfully recovered without any significant losses.

Step 4—REEs Concentration in a REEs Concentration Column

A cation exchange column was packed (1 cm i.d. and 8.5 cm Lc) with AG-MP 50 and prepared as a Cu-saturated column by loading copper sulfate (0.5 M). A synthetic mixture of DTPA-Fe (0.018 N) and DTPA-Nd (1 mN or 50 ppm) were loaded on the column at 12 cm/min until the column is saturated. After the column was washed with 1 column volume of DDW, Nd was eluted by loading 0.015 M EDTA-Na (pH 8.4) at 2.5 cm/min. The effluent histories were observed using the AKTA system with DAD detector (Agilent, G1315D).

The collected DTPA-REEs fraction can be transferred to another capture column, which is saturated with $Cu^{2+}$ ions. According to the separation mechanism of ligand-assisted displacement chromatography (LAD), $Cu^{2+}$ has higher ligand affinity and lower sorbent selectivity than that of REEs. As a result, the DTPA-Cu complex forms and REEs can be deposited in the column. Since $H^+$ or $Fe^+$ have higher ligand affinity and lower sorbent affinity than REEs, one can use those ions, alternatively.

Ideally, the continuous loading of DTPA-REEs can accumulate REEs in the capture columns until the column is saturated. However, the average concentration of REEs in DTPA fractions were 3.7 ppm, which is a very small amount to demonstrate the capture process at the laboratory scale. Therefore, a synthetic solution of DTPA-REEs fractions (DTPA-Fe/Nd) was used to show the feasibility of the capture process. The feed solution containing 50 ppm of Nd was loaded with 3 liters or 455 CV, which was presumably the volume resulted from processing 4 kg of ash. Due to a low concentration, the Nd was not detected during the feed loading so the loading was continued until the pre-loaded Cu was completely eluted out.

Figure 22B:
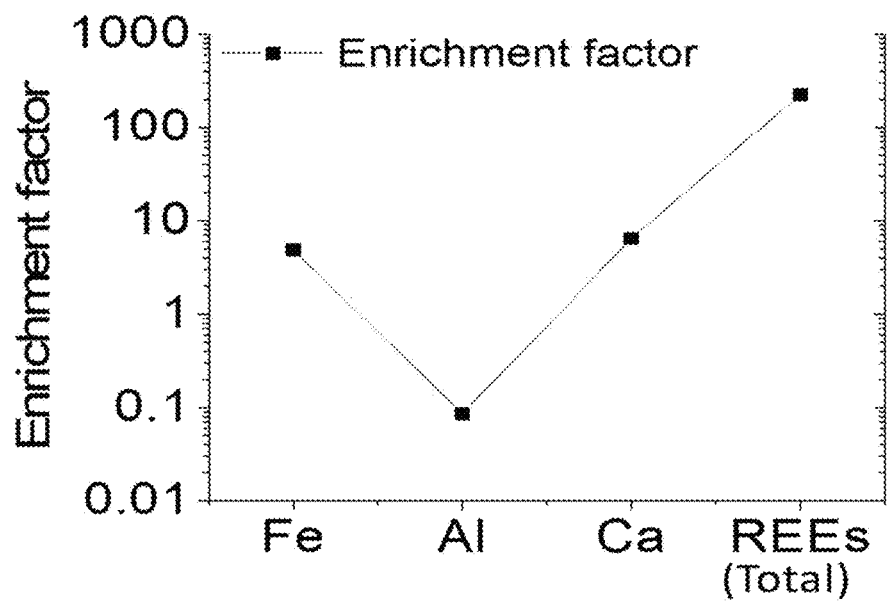
FIG. 22B shows enrichment factor of Fe, Al, Ca, and total REEs. The enrichment factors were calculated based on the ratio of the normalized total REEs concentration in the DTPA-REEs fractions to that in original ash.
Figure 23:
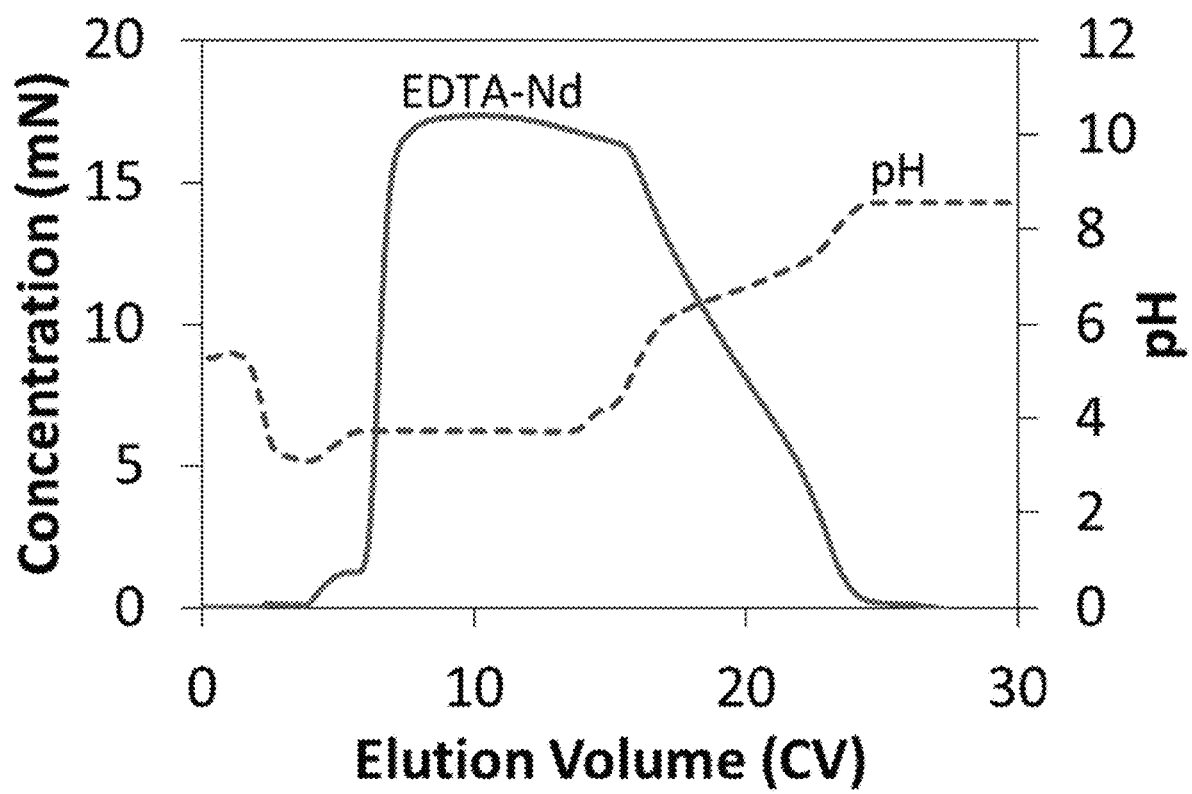
FIG. 23 shows effluent histories during 0.015 M EDTA elution of captured REEs in Step 4. A synthetic feed solution containing 18 mN DTPA-Fe and 1 mN DPTA-Nd was loaded onto a Cu-saturated bed (455 column volumes) and the captured Nd were eluted by loading 0.015M EDTA-Na (pH 8.4).

The effluent profiles in FIG. 23 show the elution curve of EDTA-Nd. The EDTA-Nd band concentration was increased almost 15 times from the feed concentration. This suggests that the low concentration of REEs can be accumulated in the column and can be concentrated using EDTA elution, which is favorable for further LAD purification processes. Even if $Ca^{2+}$ or $Fe^{3+}$ can be captured together, REEs are separated in the LAD processes because EDTA-Fe elutes ahead of EDTA-REEs and EDTA-Ca elutes behind of EDTA-REEs in LAD, similar to the elution order in FIGS. 22A and 22B.

Step 5—Magnetic Separation of Residual Solids

Figure 24:
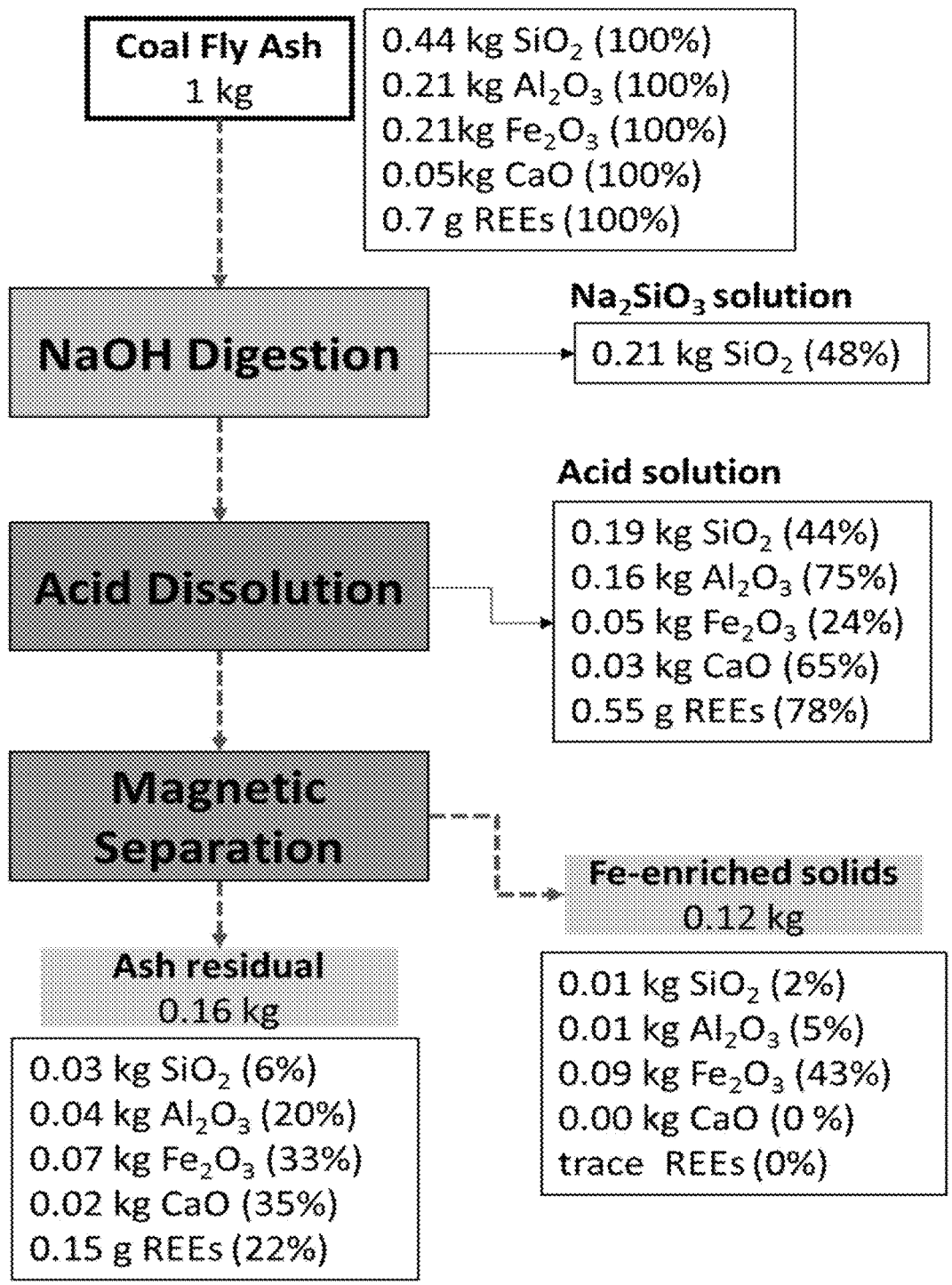
FIG. 24 shows an overall mass balance of major components and REEs after NaOH digestion, acid dissolution, and magnetic separation steps.

The residual solids after acid dissolution showed about 70% mass reduction from original ash, which is close to the expected results based on the extraction yields of major components within experimental errors. Magnetic separations were conducted to separate Fe-riched solids from others. Because the aluminum silicates glass matrix was removed, solids separated by a magnet had approximately 15 times higher concentration of Fe compared to that of Al or Si. The Fe content in the magnetically separated fraction was about 45% and this can meet Fe ore commodity requirements and therefore a promising source for Fe ores (S. S. Rath, et al., *Sep. Sci. Technol.* (2014), doi:10.1080/01496395.2014.903280). After magnetic separations, the mass of the residual solids was reduced to 16% of the original ash. The overall mass balance of major components and REEs were summarized in FIG. 24.

Figure 25:
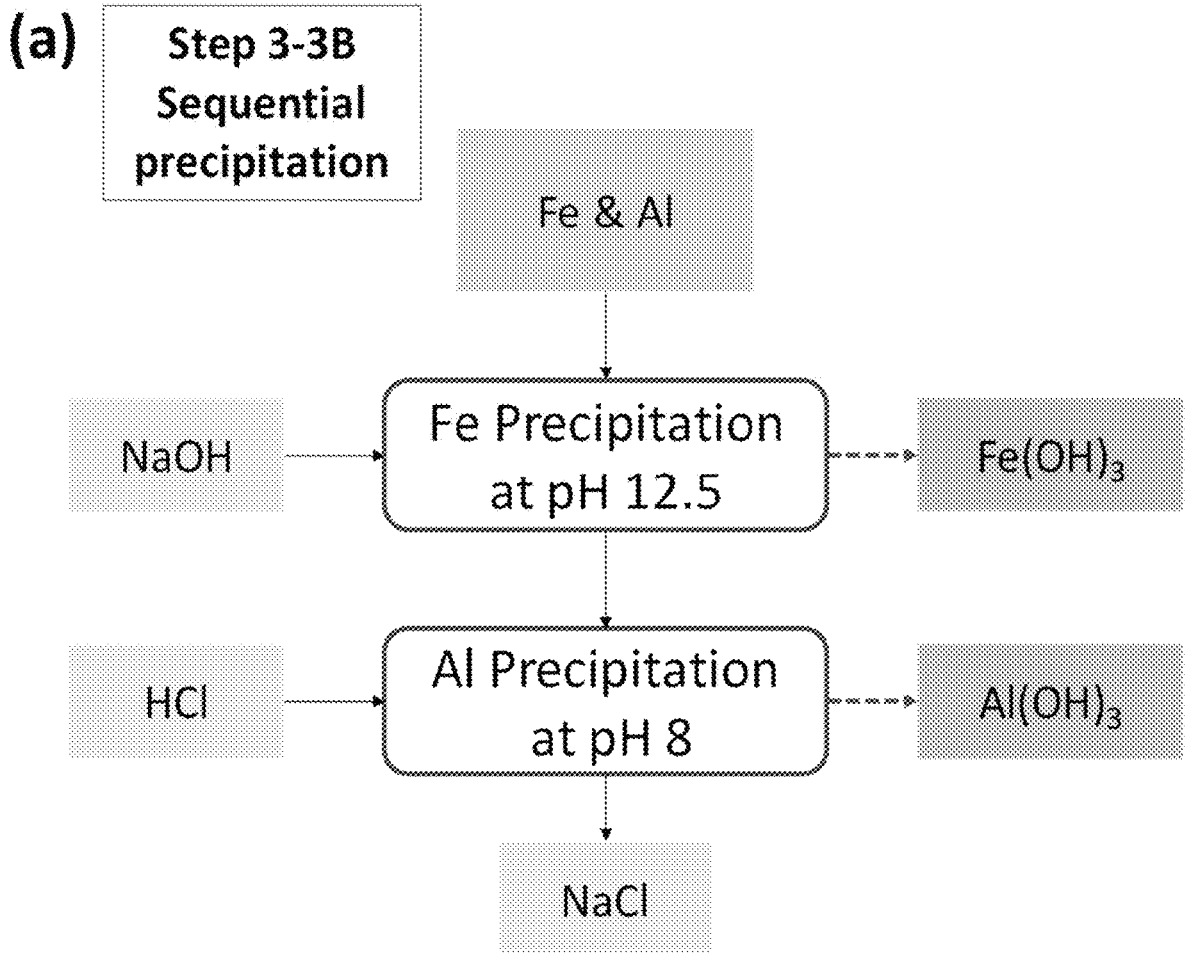
FIG. 25 shows a scheme of the sequential precipitation process (Step 3-3B).

Precipitation of Iron Hydroxide, and Aluminum Hydroxide from NaCl Effluents (Step 3-3B) (See FIGS. 14, 17 and 25)

To precipitate Fe and Al, a sequential titration method was used. 10 mL of each eluate fraction collected from the 2 M NaCl elution step were combined. The sodium hydroxide solution (1 M) was added into the obtained eluate (60 mL) until the pH reached 12.5. The mixture was continuously stirred for 1 hour and then was separate from iron hydroxide $(Fe(OH)_3)$ precipitates via filtration. Next, 1 M NaOH solution was slowly added into the filtered solution to precipitate Al at pH 8. After mixing for 1 hour, the white aluminum hydroxide $(Al(OH)_3)$ precipitates were separated from the solution via filtration. The iron precipitates and aluminum precipitates were washed three times with excessive amounts of DDW and then were dried for characterization.

In Step 3-3B, Fe and Al can be precipitated as hydroxide salts at different pH by adding NaOH into the collected NaCl effluent solutions containing both Fe and Al as shown in FIG. 25. Because of the different solubility at high pH, $Fe(OH)_3$ were first precipitated and separated from the solution at pH 12.5. The pH of the recovered solution was adjusted by adding 1 M HCl to precipitate $Al(OH)_3$ at pH 8. Both products have a relatively high purity, >95% and >99%, for $Fe(OH)_3$ and $Al(OH)_3$, respectively. After precipitation, the leftover solution contains NaCl, which can be recycled for the separation processes.

Silica Gel Precipitation and NaOH Recovery from Sodium Silicate Solution

The filtered sodium silicate solution (50 g) from the NaOH digestion step was diluted by half by adding DDW (50 g). $CO_2$ gas was bubbled into the sodium silicate solution at a flow rate of 26 mL/min for 1 hour. The precipitated silica gel was separated using centrifugation. The separated silica gel was re-suspended in DDW 100 g and the supernatant was decanted using centrifugation. This washing step was repeated two times to remove the excess $Na^+$ ions left in the silica gel solid phase. The separated NaOH solution and the washed solution containing sodium carbonate $(Na_2CO_3)$ was mixed with 10 grams of $Ca(OH)_2$ to precipitate $CaCO_3$ for 30 min. Then the solution was separated via centrifugation. The Ca concentration in the separated solution was measured using AAS and then the collected solution was titrated with 1 N HCl to measure the concentration of NaOH.

Figure 26:
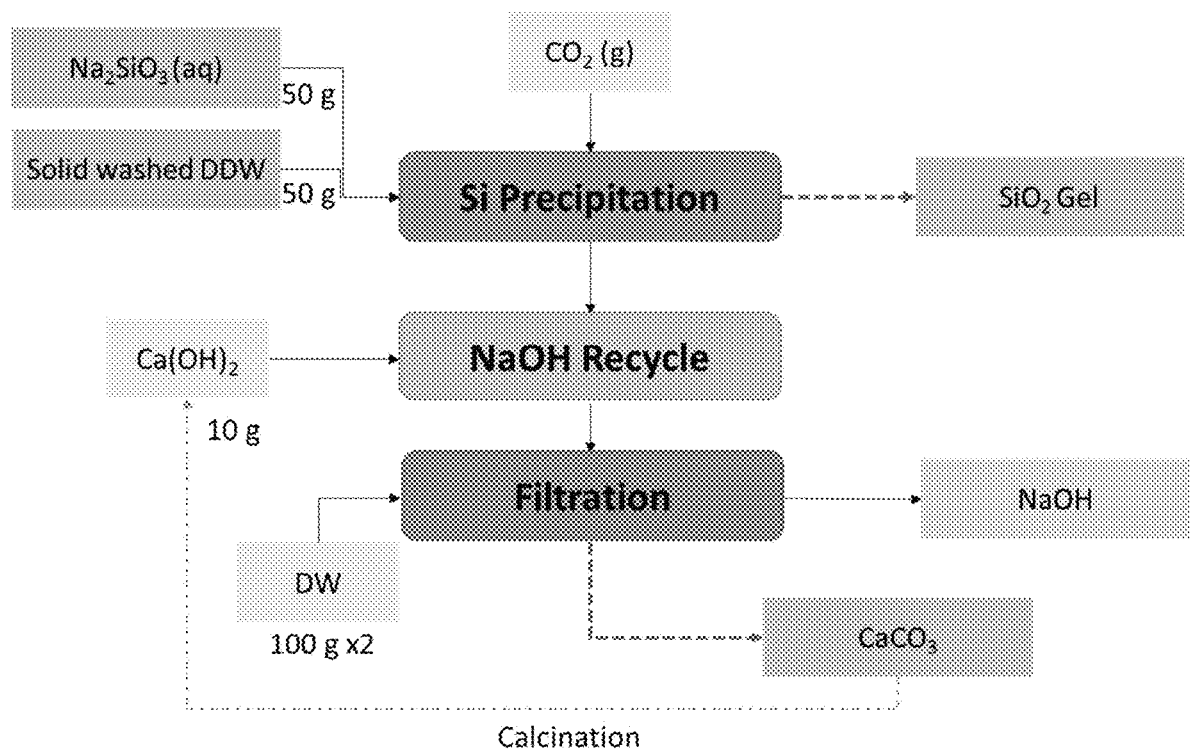
FIG. 26 shows a schematic flow chart of silica gelation processes to produce silica gel and NaOH from a sodium silicate solution

The separated NaOH solution from the NaOH digestion step dissolved 48% of SiO2 as sodium silicates. Since the NaOH digestion step requires large amounts of NaOH, efficient separation processes need to be developed for the NaOH solution to recycle NaOH and to produce SiO2 gel. Thus, a process to produce high purity silica gel and NaOH were developed as shown in FIG. 26. The separated sodium silicate solution and the solid washed solution from the washing step were combined and mixed with CO2. The reaction between NaOH and CO2 generated sodium carbonate and silica gel. The overall chemical reactions are shown below.

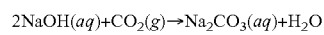

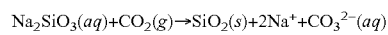

Figure 27A:
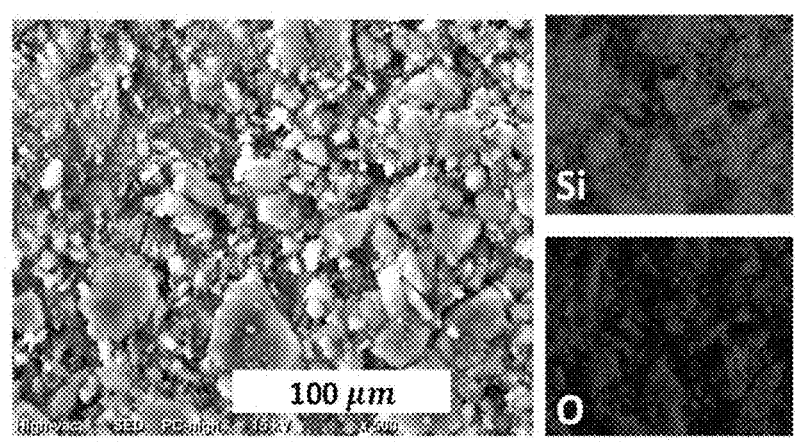
FIG. 27A is an SEM-EDS image of recovered silica gel.
Figure 27B:
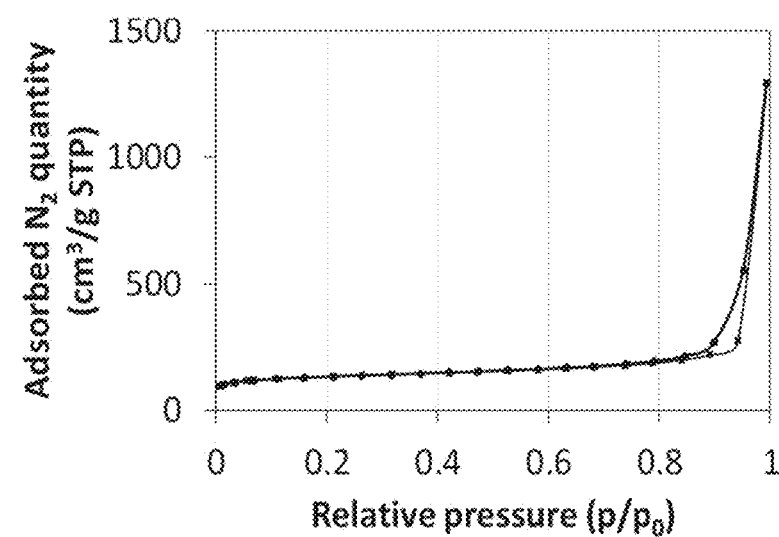
FIG. 27B shows the XRD data of recovered silica gel.
Figure 27C:
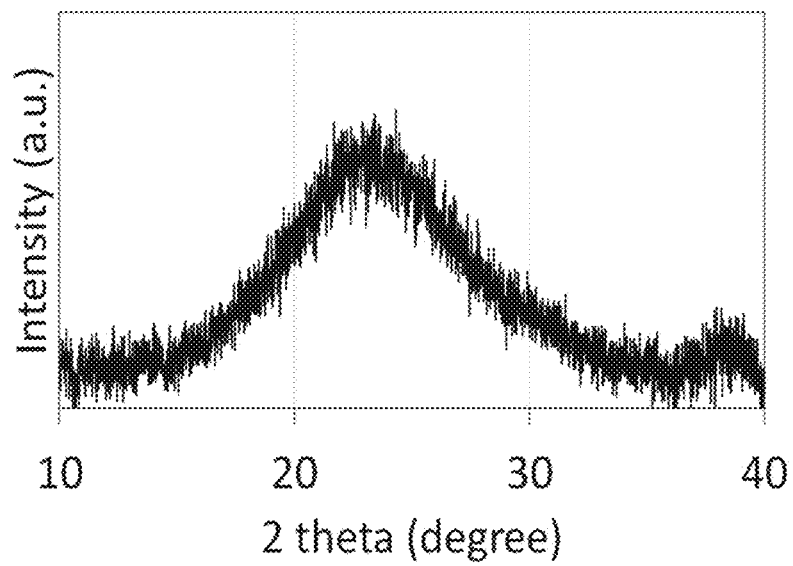
FIG. 27C shows the BED data of the silica gel produced from sodium silicate solution in the gelation process.

By bubbling $CO_2$ gas in the sodium silicate solution, NaOH reacted with $CO_2$ to generate sodium bicarbonates. Since the pH of the solution decreased to 9 so that the silica gel was produced via the sol-gel process (C. Brinker, et al., *Adv. Mater.* 1990. doi:10.1186/1471-2105-8-444). As shown in FIG. 27A, the silica gel products had high purity (>98%). The XRD data in FIG. 27B represents the amorphous structures of silica gel. Furthermore, the surface area measured from BED analysis was 459 $cm^3/ml$, showing a large surface area of common silica gel. The results in FIGS. 27A-27C demonstrate that high purity silica gel can be produced in the gelation process.

After separating the silica gel, the separated solution and the gel-washed solution contained sodium carbonates. By mixing with calcium hydroxide, sodium hydroxide was regenerated and calcium carbonate was precipitated.

The separated NaOH solution was analyzed using AAS, confirming that there was no Ca left in the solution. Titrating the NaOH solution with 1 N HCl showed that 46% of the total NaOH used in the NaOH digestion step was recovered. According to the chemical reactions forming the sodium aluminosilicates, 47% of NaOH can be left in the solid phase while 53% of NaOH remained in the sodium silicate solution. Therefore, up to 88% of recovery efficiency of NaOH was achieved experimentally from the recoverable amount of NaOH remaining in the solution. The precipitated $CaCO_3$ can be a potential product or reused after calcination.

Figure 28:
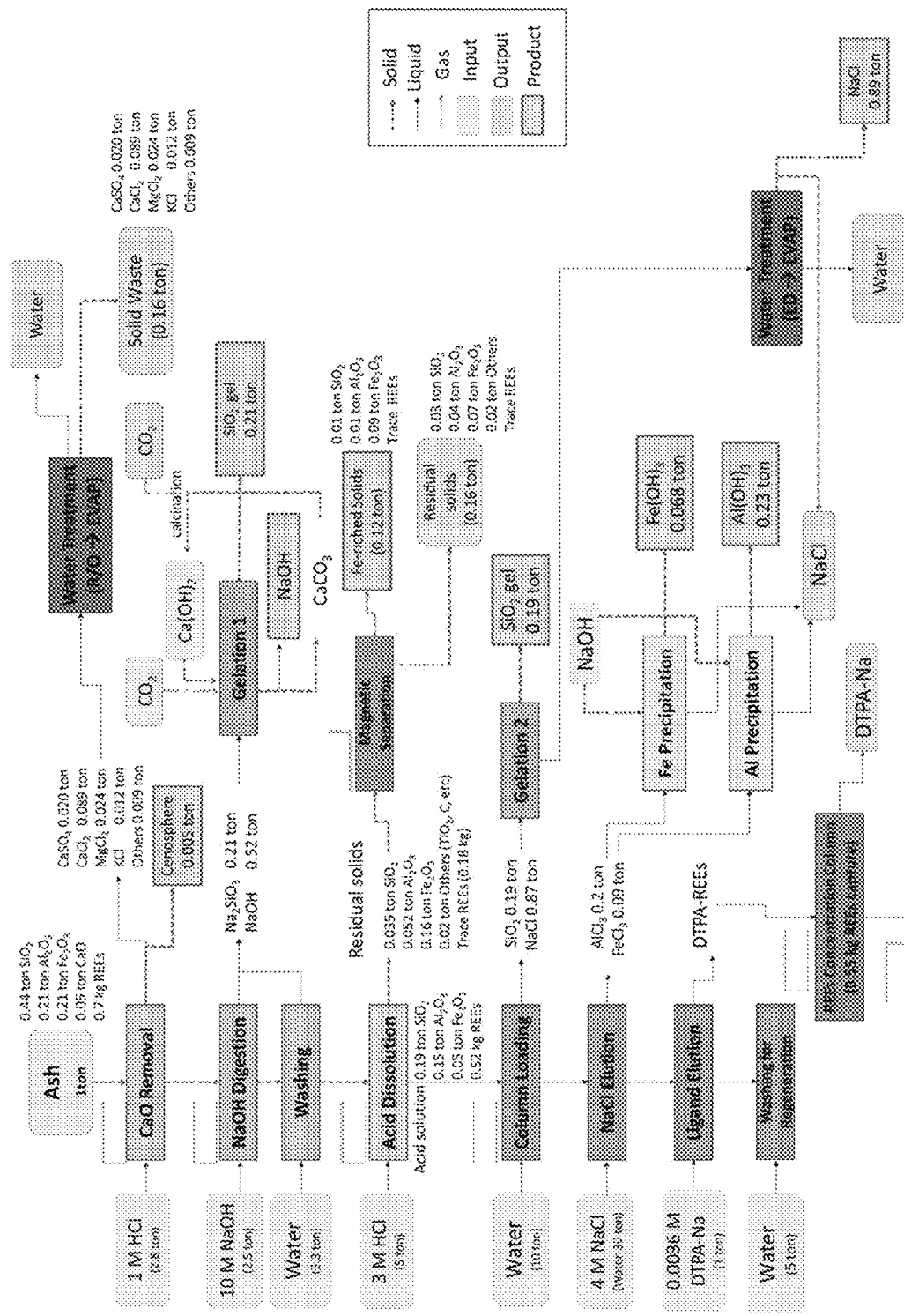
FIG. 28 is a flowchart of the large scale separation processes with the material mass balance of major components.

Scale Up of the Overall Process (FIG. 28)

As shown in previous sections, each unit operation from Step 1 to 5 and product producing steps can be combined as an overall process (FIG. 28). For large scale processes, however, Ca extraction in acid dissolution is inefficient because it increases the required volume of a capture column and also requires a large elution volume of DTPA. Therefore, it is reasonable to remove Ca in CaO removal process before performing the NaOH digestion process so that the required volume of the capture column and DTPA solution. For CaO removal, ash is washed with HCL, where the amount of acid is equivalent to Ca equivalent. The washed ash is sent to the rest of the separation processes. By removing CaO before NaOH digestion, the capture column volume is reduced by 20% and the DTPA elution volume is reduced by 80% because the DTPA solution is mainly used for REEs elution. Additionally, it is assumed that all the extracted Fe and Al are separately eluted out using NaCl elution. The flowchart of an overall process in large scales is shown in FIG. 28 with material mass balance.

To conclude, this sequential separation methods were developed to recover REEs from coal fly ash. Since most REEs were trapped in the aluminosilicates glassy matrix of ash particles the NaOH digestion step was first performed to assist efficient extraction of REEs in subsequent acid leaching. In the NaOH digestion step, 48% of silica was dissolved in 10M NaOH solution (1 to 2.5 S/L ratio) by removing the glassy matrix and also the aluminosilicates glassy matrix was converted into sodalite structures. In the subsequent acid dissolution step, REEs, Si, Al, Ca, and Fe were easily dissolved in 2 M HCl. The extraction yields of Si, Al, Fe, Ca, and REEs were 44%, 74%, 24%, 65%, and 74%, respectively. The similar yields of REEs and Al indicated that most of REEs were trapped in the aluminosilicates matrix.

The acid solution containing REEs and other major components were sent to a cation exchange step in order to recover REEs. By loading the acid solution into a capture column, >99.9% of Al, Ca, and REEs, were captured while Si species were selectively eluted out during feed loading and water washing steps. The captured Al and Fe ions were eluted by loading 2 M NaCl solutions. More than 99% of Al and 88% of Fe were eluted and produced as $Al(OH)_3$ and $Fe(OH)_3$ with the purity of >99% and >95%, respectively.

In the ligand elution step, the captured REEs, 22% of Fe, and 98% of Ca were eluted by loading 0.03 M DTPA-Na (pH 8.2). The elution results showed that most of DTPA-Fe and (>99%) DTPA-REEs were eluted together at the front of the DTPA breakthrough curve. The average concentration of the recovered REEs was 3.7 ppm, where the concentration ratio of REEs to total concentrations was increased 284 times compared to that ratio in original ash. The recovered DTPA-REEs was transferred to a REEs concentration column, which is saturated with Cu ions. Loading a large volume (455 CV) of a synthetic mixture of DTPA-Fe and DPTA-Nd and a subsequent EDTA-Na elution showed the concentrated EDTA-Nd band, demonstrating the feasibility of the concentration step at large scale. The scale up of this process can be easily conducted by using dimensionless groups such as loading fraction and $N_D$, which is the intra-particle diffusion rate relative to convection rate.

For efficient and economical processes, major components of coal fly ash, $SiO_2$, $Fe_2O_3$, and $Al_2O_3$ were also extracted and produced as valuable byproducts with high purity and high yield. The sodium silicate solution was reacted with carbon dioxide gas to produce high purity (>98%) silica gel by adjusting the pH to 9. The leftover solution was mixed with calcium hydroxide to precipitate calcium carbonate and to recover NaOH, which was about 46% of the total NaOH used in the process. The NaCl effluents containing Fe and Al were sent to sequential precipitation process to produce $Fe(OH)_3$ and $Al(OH)_3$. By adding NaOH and HCl sequentially, $Fe(OH)_3$ and $Al(OH)_3$ were produced with the purity of >95% and >99%, respectively.

After acid dissolution, the residual solids were further treated with magnetic separations. A fraction collected from magnetic separations had high contents of Fe, which can meet the Fe ore grade. The mass of final residual solids, which were nonmagnetic fractions, were 16% of the original ash. Overall, 84% of the ash contents were extracted and generated as high purity products, which contribute to reducing chemical costs in the processes.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. It should be understood by those skilled in the art that various alternatives to the embodiments described herein may be employed in practicing the claims without departing from the spirit and scope as defined in the following claims.

What is claimed is:

1. A process for preparing pure chemicals from coal ash, the process comprising:
    a. extracting coal ash with a first caustic solution at a temperature elevated above ambient;
    b. separating undissolved solid residue from said first caustic extracting solution, wherein said first caustic extracting solution is stored for later processing and said solid residue is washed with water;
    c. treating the water washed solid residue with a first acid, wherein pH of the resulting acidic solution is maintained at about 3 and then the leftover solid is separated and washed with water;
    d. extracting the water washed solid with a second caustic solution at a temperature elevated above ambient;
    e. separating undissolved solid residue from the second caustic extracting solution and washing with water wherein said second caustic extracting solution is stored for later processing;
    f. treating the undissolved solid residue with a second acid to bring the pH of the resulting acidic solution to about 3, and isolating the leftover solid as a purified iron oxide with aluminum silicate;
    g. combining the acidic extraction solutions from steps c and f, and adjusting the pH to about 5 with a base whereby aluminum silicate precipitates out from the solution as a product and the leftover solution contains enriched rare earth elements (REEs); and
    h. combining the first and the second caustic extracting solutions to recover purified sodium silicate by pH adjustment with ana third acid, wherein at least one respective caustic extraction solution includes sodium hydroxide and wherein at least one respective caustic extraction solution includes potassium hydroxide.

2. The process of claim 1 further comprising steps of isolation and purification of each individual REE from said leftover acid extraction solution by a ligand-assisted chromatography comprising
    a. enriching by capturing said REEs on an ion exchange column;
    b. eluting REEs from said ion exchange column with a chelating ligand;
    c. binding said chelating ligand solution of REEs to an absorbent column;
    d. eluting individual REE with an isocratic or gradient of a ligand;
    e. combining respective fractions of respective pure individual REE separately; and
    f. recovering individual REE from the combined fractions.

3. The process of claim 2 wherein the chelating ligand is EDTA salt and further comprising a step of precipitating and recycling EDTA salt.

4. The process of claim 1, wherein the coal ash is fly ash.

5. The process of claim 1, wherein the second caustic extracting solution is the solution from the first caustic extraction.

6. The process of claim 1, wherein the concentration of at least one respective caustic extracting solution is from about 1 M to about 15 M.

7. The process of claim 1, wherein at least one respective acid is hydrochloric acid, sulfuric acid, or nitric acid.

8. The process of claim 1, wherein the concentration of at least one respective acid is from about 0.01 M to about 12 M.

9. The process of claim 1, wherein the temperature elevated above ambient is from about 50° C. to about 250° C.

10. The process of claim 1, wherein the mass ratio of coal ash to base of at least one respective caustic extraction solution is from about 1:1 to about 1:10.

11. The process of claim 1, wherein said sodium silicate from caustic extraction is acidified to afford silica gel.

12. A process for preparing pure chemicals from coal ash, the process comprising:
   a. extracting coal ash with a caustic solution at a temperature elevated above ambient;
   b. separating undissolved solid residue from said caustic extraction solution and washing said undissolved solid residue with water;
   c. treating the water washed solid residue with an acid at a mass ratio of solid to acid about 1:10 and then separating leftover solid to afford an acidic extraction solution;
   d. loading the acidic extraction solution to a cation exchange column and collecting the pass-through eluent;
   e. treating the pass-through eluent with a base to pH about 3, at which point iron hydroxide precipitates out and is isolated; then bringing the pH of the solution up to about 8 whereby aluminum hydroxide precipitates out and is isolated; and
   f. eluting the loaded cation exchange column first with a solution of sodium chloride to afford fractions containing aluminum and iron, and then with a solution of a chelating ligand to afford fractions of enriched REEs;

wherein the caustic extraction solution includes both sodium hydroxide and potassium hydroxide.

13. The process of claim 12 further comprising steps of isolation and purification each individual REE from said fractions of enriched REEs, the steps comprising
   a. capturing said REEs on an ion exchange column,
   b. eluting REEs from said ion exchange column with a chelating ligand,
   c. binding said chelating ligand solution of REEs to an absorbent column,
   d. eluting individual REE with an isocratic or gradient of a ligand,
   e. combining respective fractions of respective pure individual REE separately, and
   f. recovering individual REE from the combined fractions.

14. The process of claim 13 wherein the chelating ligand is EDTA salt and further comprising a step of precipitating and recycling EDTA salt.

15. The process of claim 12 further comprising a step of washing coal ash with acid to remove calcium oxide and other salts of alkali earth metals before extracting with a caustic solution at a temperature elevated above ambient.

16. The process of claim 12 further comprising a step of exposing the leftover solid from acid extraction to a magnetic field and collecting materials attracted to said magnetic field as an iron-enriched product.

17. The process of claim 12 further comprising a step of acidifying said caustic extraction solution to afford silica gel.

18. The process of claim 12, wherein the caustic extracting solution has a concentration from about 1 M to about 15 M.

19. The process of claim 12, wherein the acidic extraction solution is made of an acid selected from the group consisting of hydrochloric acid, sulfuric acid, and nitric acid.

20. The process of claim 12, wherein the acidic extraction solution has a concentration from about 0.1 M to about 12 M.

21. The process of claim 12, wherein said temperature elevated above ambient is from about 50° C. to about 250° C.

* * * * *